US006961835B2

(12) United States Patent
Lightstone et al.

(10) Patent No.: US 6,961,835 B2
(45) Date of Patent: Nov. 1, 2005

(54) SYSTEM AND METHOD FOR AUTONOMICALLY REALLOCATING MEMORY AMONG BUFFER POOLS

(75) Inventors: Sam S. Lightstone, Toronto (CA); Adam J. Storm, Thornhill (CA); Gary Valentin, Toronto (CA); Daniel C. Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 10/391,686

(22) Filed: Mar. 19, 2003

(65) Prior Publication Data

US 2004/0078541 A1   Apr. 22, 2004

(30) Foreign Application Priority Data

Oct. 17, 2002 (CA) .................... 2408481

(51) Int. Cl.[7] .............................................. G06F 12/00
(52) U.S. Cl. .................. 711/171; 711/143; 710/53; 710/56; 710/57
(58) Field of Search .................... 711/133, 171, 216, 711/143; 710/310, 53, 56–57; 709/234; 707/205; 714/6

(56) References Cited

U.S. PATENT DOCUMENTS

| | | | |
|---|---|---|---|
| 5,093,912 A | * | 3/1992 | Dong et al. ............... 718/104 |
| 5,627,994 A | | 5/1997 | Levy et al. ................ 395/477 |
| 5,768,500 A | | 6/1998 | Agrawal et al. ........ 395/184.01 |
| 5,784,698 A | * | 7/1998 | Brady et al. .............. 711/171 |
| 5,870,551 A | | 2/1999 | Ozden et al. ........... 395/200.49 |
| 5,974,518 A | | 10/1999 | Nogradi ................... 711/173 |
| 6,286,080 B1 | | 9/2001 | Galbraith et al. .......... 711/113 |
| 6,738,866 B2 | * | 5/2004 | Ting ........................ 711/133 |

FOREIGN PATENT DOCUMENTS

| | | | |
|---|---|---|---|
| JP | 58169650 A2 | 10/1983 | .......... G06F 13/00 |
| JP | 61032155 A2 | 2/1986 | .......... G06F 13/10 |
| JP | 3265948 A2 | 11/1991 | .......... G06F 12/02 |
| JP | 2000057027 A2 | 2/2000 | |
| WO | 83/00758 | 3/1983 | ............ G06F 7/00 |

* cited by examiner

*Primary Examiner*—Mano Padmanabhan
*Assistant Examiner*—Mardochee Chery
(74) *Attorney, Agent, or Firm*—Samuel A. Kassatly

(57) ABSTRACT

A system and method autonomically reallocate memory among buffer pools to permit quick access to data. A simulated buffer pool extension (SBPX) is created for each buffer pool in a set of buffer pools. Data victimized from a buffer pool is represented in the associated SBPX. Requests for data that is not resident in a buffer pool but is represented in the associated SBPX are tallied. Periodically, an expected efficiency benefit of increasing the capacity of each buffer pool is determined from the tallies. Memory is reallocated from the buffer pool with the lowest expected efficiency benefit having remaining reallocatable memory to the buffer pool with the highest expected efficiency benefit having remaining reallocatable memory, until either one or both of the buffer pools exhausts its reallocatable memory. This process is repeated until all reallocatable memory has been reallocated, until only one buffer pool with reallocatable memory remains, or until all buffer pools with remaining reallocatable memory have substantially the same expected efficiency benefit.

44 Claims, 15 Drawing Sheets

| | a | b | c | d | e | f | g | h |
|---|---|---|---|---|---|---|---|---|
| | BUFFER POOL ID | BUFFER POOL CAPACITY (MEMORY PAGES) | SPBX ID | SPBX CAPACITY (MPRs) | SAVED MISSES COUNT | AVERAGE COST OF A MEMORY PAGE MISS (MSEC) | EXPECTED BENEFIT (MSEC PER PAGE) | EXPECTED BENEFIT RANKING |
| 801 | 710 | 1000 | 730 | 100 | 10 | 11 | 1.1 | 6 |
| 802 | 712 | 800 | 732 | 80 | 44 | 10 | 5.5 | 2 |
| 803 | 714 | 250 | 734 | 25 | 15 | 10 | 6.0 | 1 |
| 804 | 716 | 900 | 736 | 22 | 22 | 12 | 2.9 | 5 |
| 805 | 718 | 500 | 738 | 20 | 12 | 4.8 | 4 |
| 806 | 720 | 300 | 740 | 30 | 15 | 10 | 5.0 | 3 |

| | a | b | c | d | e |
|---|---|---|---|---|---|
| | EXPECTED BENEFIT RANKING | BUFFER POOL ID | NUMBER OF REALLOCATABLE PAGES | NUMBER OF PAGES ALLOCATED | NUMBER OF REMAINING UNALLOCATED PAGES |
| 811 | 1 | 714 | 25 | +25 | 0 |
| 812 | 2 | 712 | 80 | +80 | 0 |
| 813 | 3 | 720 | 30 | +30 | 0 |
| 814 | 4 | 718 | 50 | +50 | 0 |
| 815 | 5 | 716 | 90 | -85 | 5 |
| 816 | 6 | 710 | 100 | -100 | 0 |

| | a | b | c | d |
|---|---|---|---|---|
| | BUFFER POOL ID | BUFFER POOL CAPACITY (MEMORY PAGES) | SBPX ID | SBPX CAPACITY (MPRs) |
| 821 | 710' | 900 | 730' | 90 |
| 822 | 712' | 880 | 732' | 88 |
| 823 | 714' | 275 | 734' | 28 |
| 824 | 716' | 815 | 736' | 82 |
| 825 | 718' | 550 | 738' | 55 |
| 826 | 720' | 330 | 740' | 33 |

FIG. 8C

| | a | b | c | d | e | f |
|---|---|---|---|---|---|---|
| | BUFFER POOL ID | BUFFER POOL CAPACITY (MEMORY PAGES) | SPBX ID | SPBX CAPACITY (MPRs) | SAVED MISSES COUNT | EXPECTED BENEFIT (MSEC PER PAGE) |
| 1301 | 1210 | 1000 | 1230a | 50 | 10 | 2.0 |
| | | | 1230b | 30 | 14 | 3.0 |
| | | | 1230c | 20 | 1 | 2.5 |
| 1302 | 1212 | 800 | 1232a | 40 | 8 | 2.0 |
| | | | 1232b | 24 | 6 | 2.2 |
| | | | 1232c | 16 | 0 | 1.8 |
| 1303 | 1214 | 500 | 1234a | 25 | 6 | 2.4 |
| | | | 1234b | 15 | 4 | 2.5 |
| | | | 1234c | 10 | 1 | 2.2 |

FIG. 13

SYSTEM AND METHOD FOR AUTONOMICALLY REALLOCATING MEMORY AMONG BUFFER POOLS

PRIORITY CLAIM

The present application claims the priority of Canadian patent application, Ser. No. 2,408,481, titled "Autonomic Reallocation of Memory Among Buffer Pools," filed on Oct. 17, 2002, and which is incorporated herein by reference.

FIELD OF THE INVENTION

The present invention generally relates to computer memory management, and it more specifically relates to a system and associated method for autonomically reallocating computer memory among buffer pools.

BACKGROUND OF THE INVENTION

Data processing systems, such as database management systems (DBMSs) commonly operate with multiple buffer pools. Buffer pools are data caches located in volatile memory that are primarily used to store recently accessed data. The purpose of a buffer pool is to permit application data of immediate importance to be quickly accessed by an application from volatile memory, and thereby limit the need to load such data from secondary storage (e.g., a disk or tape drive). There is a disadvantage for incurring associated physical I/O delays of secondary storage. Since accesses to volatile memory can be several orders of magnitude faster than accesses to secondary storage, significant efficiency gains (such as increased speed of program execution) may be achieved through the use of buffer pools.

Data stored in a buffer pool is typically stored in the form of memory pages. As known by those skilled in the art, a memory page is essentially a contiguous block of data as it appears in secondary storage. In most cases, a memory page may include a "header" portion that uniquely identifies the memory page and may include a data portion that may provide application data. The data portion is typically substantially larger than the header portion.

A buffer pool may have sufficient storage capacity to store thousands or even millions of memory pages, with the number of memory pages per buffer pool being configured by the user. To manage these memory pages, a number of data structures are typically maintained. For example, a hash bucket list may be maintained to support efficient storage of, and access to, memory pages within the buffer pool.

In addition, data structures relating to an operative buffer pool memory page victimization scheme may be maintained. Memory page "victimization" (or "eviction") refers to the removal of a memory page from a buffer pool to provide space for an incoming page, as may be necessary upon the occurrence of a memory page miss (that is, a request for a memory page that is not presently in the buffer pool) when the buffer pool is filled to capacity.

The purpose of known victimization schemes is usually to evict the memory page that is least likely to require reloading into the buffer pool in the future so that future secondary storage physical I/O delays may be minimized. This goal is, of course, difficult to achieve as it entails some degree of prediction of future events that may or may not prove to be accurate.

An example of a victimization scheme is the Least Recently Used (LRU) approach, in which memory pages that have been used least recently are targeted for victimization from the buffer pool in the expectation that pages which have not recently been accessed are least likely to be accessed in the future. In that scheme, an LRU linked list data structure is often maintained for the purpose of organizing the memory pages in chronological order of most recent use.

When a database utilizes multiple buffer pools, the size of each buffer pool may be independently adjustable to permit the pools to be adapted to various applications or data objects. For example, it may be desirable to increase the size of one or more buffer pools used in conjunction with an application that cyclically accesses a finite set of memory pages (e.g., due to a programming loop).

This will ensure that the buffer pool is sufficiently large to be able to contain all of the memory pages accessed during the loop or cycle and may avoid the need to repeatedly load the same memory pages into the buffer pool. Alternatively, if the application scans large data sets in a single pass, the use of a large buffer pool may not be warranted as even a large size may not preclude a significant number of memory page misses. Buffer pool sizes may also be dictated more generally by competing performance and cost concerns. On one hand, large buffer pools may be advantageous in that the frequency of memory page misses may be reduced. On the other hand, smaller buffer pools may be less expensive to implement and may have a higher degree of utilization than a large buffer pool.

One known method of buffer pool size selection is based on a simulation or modeling of the associated application's anticipated memory page access patterns; this simulation is performed prior to run time. In a typical simulation, statistical methods are used to project memory access patterns based on the nature of the application to be executed and the anticipated system load. Memory is then allocated to the buffer pools prior to run-time on the basis of the projected patterns, with a view to minimizing the number of accesses to secondary storage.

An intrinsic flaw of such known methods of buffer pool memory allocation is the fact that actual application behavior may differ from projected behavior due to unforeseen events, such as variable system loads, network delays, unanticipated user behavior or changes in the workload behavior. When unforeseen events occur, the assumptions underlying a particular buffer pool memory allocation may be invalidated. In addition, the performance of the data processing system may disadvantageously suffer because the chosen buffer pool sizes may prove to be ill suited for the data access patterns that actually occur. Moreover, adjustment of buffer pool sizes may necessitate suspension or termination of the executing application.

At least one dynamic memory reallocation scheme has been proposed, according to which a database system has multiple buffer pools with a fixed cumulative capacity in which the user specifies a random access response time goal for each buffer pool prior to run time.

In operation, the buffer pool sizes are automatically expanded or contracted based on the database workload to achieve the response time goals, with the cumulative capacity of the buffer pools remaining constant. Disadvantageously, this approach still requires the user to "set" the desired response times prior to run time. If unforeseen system events occur during operation that cause the system's processor to be loaded in an unanticipated way, the response times set by the user may not actually be representative of desirable or achievable thresholds and system efficiency may suffer.

What is therefore needed is a solution that addresses, at least in part, the above-noted difficulties in allocating or reallocating computer memory among buffer pools to maximize response time and system efficiency. The need for such a system has heretofore remained unsatisfied.

SUMMARY OF THE INVENTION

The present invention satisfies this need, and presents a system, a computer program product, and an associated method (collectively referred to herein as "the system" or "the present system") for autonomically reallocating computer memory among multiple buffer pools capable of storing data (e.g., memory pages).

In accordance with the autonomic memory reallocation method of the present system, a simulated buffer pool extension (SBPX) is created for each buffer pool in a set of buffer pools to simulate the effect of extending the buffer pool by a selected amount of memory. The SBPX stores representations of data (e.g., representations of memory pages) that uniquely identify, but are preferably substantially smaller than, the data stored in the buffer pool.

During system operation, when space for new data is needed in a buffer pool a primary victimization scheme victimizes data from the buffer pool and represents it in the associated SBPX. This simulates the effect that an actual buffer pool extension would have (i.e., the victimized data would not yet be victimized from the buffer pool). The primary victimization scheme may select the least recently used (LRU) data in the buffer pool for victimization.

If space is needed in the SBPX for the data representation, a secondary victimization scheme removes data representations therefrom. The secondary victimization scheme matches or closely approximates the primary victimization scheme to effectively simulate the extension of the buffer pool.

During system operation, a tally of "saved misses", i.e., cases in which desired data is not found to be resident in the buffer pool but is found to be represented in the associated SBPX, is maintained for each buffer pool. Each saved miss represents a case in which an actual buffer pool extension of the simulated size would have avoided the need to access secondary storage to retrieve the desired data and would therefore have improved system efficiency.

Periodically, the tallied saved misses are used to compute, for each buffer pool, an expected efficiency benefit that would likely be realized by extending the buffer pool as simulated. The expected efficiency benefit assumes that future data access patterns are comparable to the access patterns yielding the current saved miss tallies. The expected efficiency benefit may be an estimate of the time that would be saved due to the expected reduction in the number of memory page misses.

Once the expected efficiency benefits for all the buffer pools have been computed, memory is reallocated among buffer pools according to the "greedy" goal satisfaction algorithm described in J. Chung et al, "Goal Oriented Dynamic Buffer Pool Management for Database Systems", in the International Conference of Engineering of Complex Computer Systems, 1995, (referred to herein as the "greedy memory reallocation algorithm").

More specifically, an amount of reallocatable memory (i.e., memory that may be either removed from or added to a buffer pool) is designated for each buffer pool. This amount of reallocatable memory may be expressed in terms of a number of reallocatable memory pages. Thereafter, the buffer pool with the lowest expected efficiency benefit with reallocatable memory remaining transfers memory to the buffer pool with the greatest expected efficiency benefit with reallocatable memory remaining, until one or the other (or both) exhausts (i.e., reallocates) all of its reallocatable memory.

This is repeated until all reallocatable memory has been reallocated, until only one buffer pool with reallocatable memory remains, or until the benefit of resizing is outweighed by the cost of resizing. The benefit of resizing is outweighed by the cost of resizing when all buffer pools with remaining reallocatable memory have substantially the same expected efficiency benefit such that the potential benefit of any additional memory page transfers is eliminated. At this point, the memory reallocation algorithm converges.

Once the algorithm has converged, the saved miss counters are reset, the tallying of saved misses begins anew, and the process is repeated. Memory reallocation occurs periodically throughout the system's operation (e.g., at fixed time intervals).

Advantageously, dynamic memory reallocation according to this method adapts the buffer pool sizes to actual memory access patterns regardless of whether those patterns follow statistically projected distributions. The method is thus capable of adapting the buffer pool memory allocation to unforeseen or unanticipated system events.

Moreover, because memory reallocation is performed automatically at run time, there is typically no need for a user to suspend or terminate the associated executing application to adjust a desired performance goal. In addition, extensions of lesser efficacy may be avoided because the expected benefit of each simulated buffer pool extension may be determined without the need to actually extend the buffer pools.

Optionally, the effects of extending a buffer pool by different amounts of memory may be assessed simultaneously. This may be performed using multiple SBPXs per buffer pool or a single SBPX per buffer pool. For each buffer pool, the pool extension size providing the maximum expected efficiency benefit may be selected.

In accordance with an aspect of the present system there is provided a method for autonomically optimizing memory distribution among buffer pools in a data processing system. For each buffer pool, this method of the present system stores representations of data victimized from the buffer pool in an associated simulated buffer pool extension (SBPX), the data representations being smaller than the victimized data. In addition, for each buffer pool, this method of the present system tallies requests for data that is not resident in the buffer pool but is represented in the associated SBPX.

In accordance with another aspect of the present system there is provided a simulated buffer pool extension data structure including at least one representation of data victimized from a buffer pool; this data representation uniquely identifying, and being smaller than, the data.

In accordance with yet another aspect of the present system there may be provided a data product including a data processing system readable medium having system programmed instructions embodied therein for directing a data processing system to implement the above described method.

In accordance with yet another aspect of the present system there may be provided a data processing system having a processor operationally coupled to memory for storing processor readable and executable instructions for directing said data processing system to undertake the above described method.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 8 comprises FIGS. 8A, 8B and 8C, and illustrates in the form of tables various data that are used by the data processing system of FIG. 1 to determine the manner in which memory will be reallocated and showing the effect of an exemplary memory reallocation;

FIG. 13 is a table illustrating various data that is used by the alternative embodiment of FIG. 12 for determining the manner in which memory will be reallocated.

DETAILED DESCRIPTION OF PREFERRED EMBODIMENTS

Figure 1:
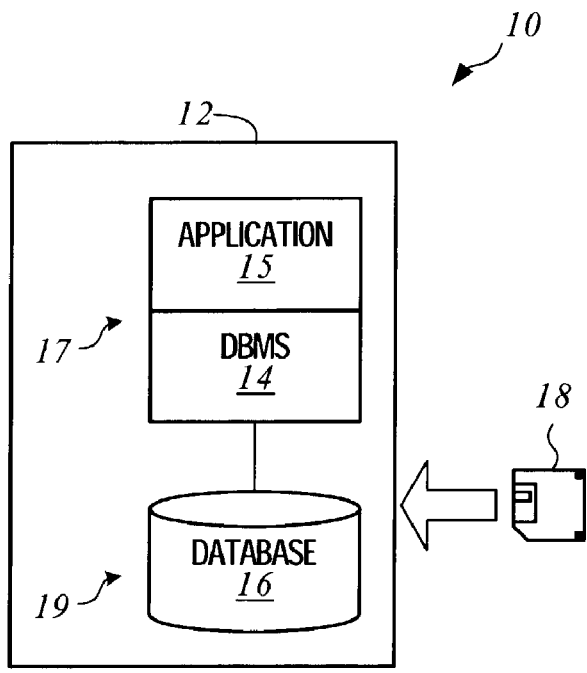
FIG. 1 is a schematic illustration of an exemplary operating environment in which an autonomic reallocation of memory among buffer pools system of the present invention can be used.

The following definitions and explanations provide background information pertaining to the technical field of the present invention, and are intended to facilitate the understanding of the present invention without limiting its scope:

API: Application Program Interface, a language and message format used by an application program to communicate with the operating system or some other control program such as a database management system (DBMS) or communications protocol.

SQL: Structured Query Language, a standardized query language for requesting information from a database.

An embodiment of the present invention provides an autonomic method for directing a data processing system to autonomically optimize memory distribution between data caches (also known as buffer pools). For example, the method may be used in a database system stored in the memory of the data processing system. This database system may include a Database Management System (DBMS) and a database.

Another embodiment of the present invention provides a data processing system for autonomically optimizing memory distribution between data caches (also known as buffer pools). For example, the data processing system may be used for the implementation of a database system stored in the memory of the data processing system. This database system may also include a Database Management System (DBMS) and a database.

Another embodiment of the present invention provides a data processing product (such as a computer program product) having a data processing system readable medium for storing system executable instructions for directing a data processing system to autonomically optimize memory distribution between data caches (also known as buffer pools). For example, the data processing product may be used to implement a database system stored in the memory of the data processing system. This database system may also include a Database Management System (DBMS) and a database.

An autonomic system is self-controlling and is functionally independent; that is, an autonomic system operates without the need for external or manual stimuli that may be provided by database administrators to govern its daily operation. The embodiment of the invention can be used in a database system to distribute or redistribute memory as will be described below.

When human administrators manually perform the tasks of memory distribution and memory redistribution, the effectiveness of these tasks depends heavily on the level of skill of any one particular human administrator; thus, optimal performance of a database may not be achieved in a consistent manner. The present invention responds to changes in the use of the database system in a dynamic or autonomic manner. For example, the database may be used differently during weekday operations than during weekend operations.

The embodiment of present invention provides adaptive control for sensing the change in operational use of data caches in order to optimize towards current system use of these data caches. Adjustment of data caches becomes a self-optimizing feature of the system.

FIG. 1 illustrates a data processing system 10 (also known as a computer system or a computing device) for executing an exemplary autonomic method (via data processing instructions stored on a readable medium) to direct the system autonomically optimize memory distribution between data caches (also known as buffer pools). For example, such a method may be used in a database system (which may include a Database Management System (DBMS) and a database) stored in the memory of the data processing system. System 10 includes a software programming code or computer program product that is typically embedded within, or installed on a computer. Alternatively, system 10 can be saved on a suitable storage medium such as a diskette, a CD, a hard drive, or like devices.

As illustrated, data processing system 10 comprises a single computing device 12. Computing device 12 is a conventional computing device including volatile memory 17 (e.g., RAM), non-volatile memory 19 (e.g., a set of hard drives), and a processor (not shown). The volatile memory 17, non-volatile memory 19 and processor are capable of intercommunication in a conventional manner. Non-volatile memory 19 may alternatively be referred to as secondary storage 19.

Volatile memory 17 stores an executing database management system (DBMS) 14 and application 15. DBMS 14 may be a conventional DBMS, such as DB2® from IBM® or SQL Server™ from Microsoft® for example, that has been configured or modified to implement the autonomic method of an embodiment of the present invention in the manner described herein. It will be appreciated that references to "dynamic memory reallocation method" in the description of the embodiments of the present invention will be understood to refer to the autonomic method of the present invention. The DBMS 14 includes multiple buffer pools (not shown in FIG. 1) for storing memory pages that are utilized by the application 15.

The application 15 is a software application that accesses data stored in a database by way of the DBMS 14 using API calls, such as SQL statement invocations for example. The application 15 may be an airline ticket reservation client application or similar application.

Non-volatile memory 19 stores a database 16 that is accessed by way of the DBMS 14. The database 16 stores data used by the application 15 (which in the present example may comprise airline ticket reservations). In the present embodiment, the database 16 is a relational database. However, in alternative embodiments, database 16 may be any other type of conventional database, such as a flat-file database.

The DBMS 14, database 16, and application 15 may be loaded from a computer program product having a readable medium, such as a removable optical or magnetic disk 18.

Figure 2:
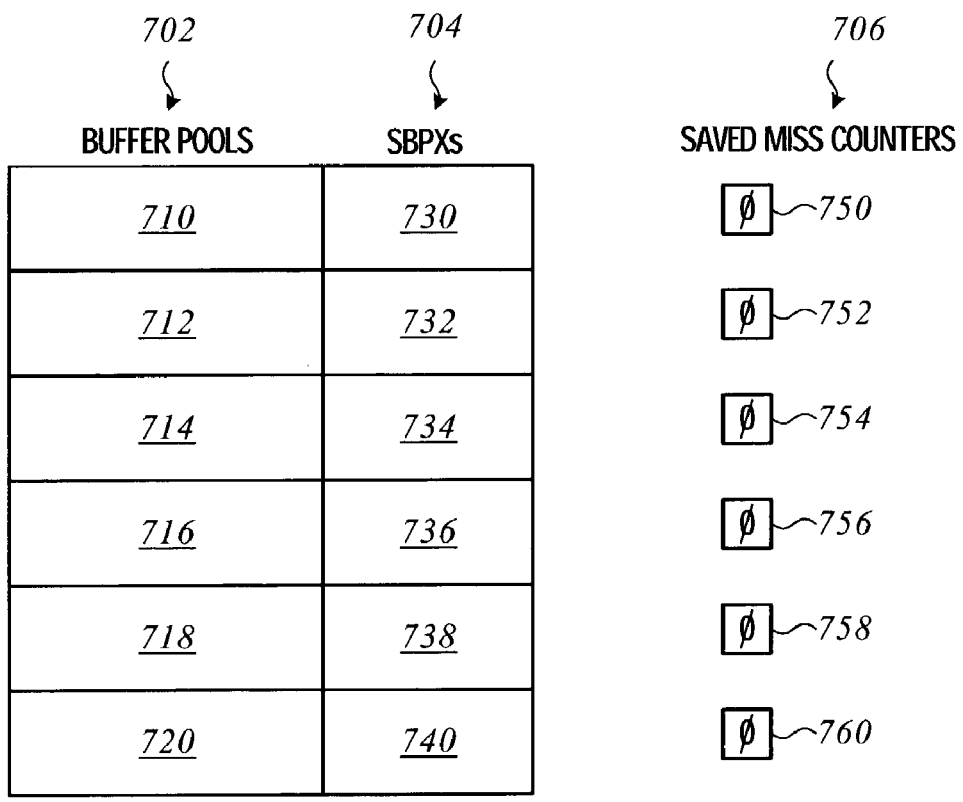
FIG. 2 is a diagram illustrating buffer pools and associated data structures used by the data processing system of FIG. 1 for memory reallocation.

FIG. 2 illustrates various data structures that form part of the DBMS 14 of FIG. 1. In particular, FIG. 2 illustrates a set of six buffer pools 702, six simulated buffer pool extensions (SBPXs) 704, and six "saved miss" counters 706. The illustrated data structures are all understood to be resident in volatile memory 17, and forms part of the DBMS 14.

Buffer pools 702 are areas of volatile memory 17 used to store memory pages containing data that is presently being accessed, has recently been accessed, or is likely to be accessed in the near future by the application 15 (FIG. 1). The set of buffer pools 702 of the present embodiment comprises six buffer pools 710, 712, 714, 716, 718 and 720. It will be appreciated that alternative embodiments may employ a greater or lesser number of buffer pools. In a typical DBMS application, the number of buffer pools may be ten or fewer.

Simulated buffer pool extensions (SBPXs) 704 are areas of volatile memory 17 that are used to simulate the effect of extending the buffer pools 702 by a selected amount of added storage capacity. Each buffer pool 710, 712, 714, 716, 718 and 720 of the set of buffer pools 702 has a single associated SBPX 730, 732, 734, 736, 738 and 740 (respectively). The latter SBPXs cumulatively form the set of SBPXs 704. Each SBPX stores representations of memory pages that have been victimized from the associated buffer pool (and which, in the absence of the SBPX, would exist only in secondary storage 19). The capacity of each SBPX (i.e., maximum number of MPRs) may exceed the capacity of the associated buffer pool (i.e., maximum number of memory pages). MPR means "memory page representations".

"Saved miss" counters 706 are used to count "saved misses" which occur in the buffer pools 702 and SBPXs 704. A "saved miss" is a memory page miss in a buffer pool where the desired page is found to be represented in the associated SBPX. Each "saved miss" represents a situation in which a memory page miss could have been avoided if the buffer pool memory were extended as simulated.

Assuming future memory page access patterns are comparable to recent patterns, each "saved miss" also represents an opportunity to avoid a memory page miss in the future if the buffer pool is extended as simulated. The greater the number of saved misses, the greater the number of accesses to secondary storage 19 that will likely be avoided by the extension, and the greater the expected benefit of the extension. Each "saved miss" counter 750, 752, 754, 756, 758 and 760 tallies saved misses for its respective buffer pool 710, 712, 714, 716, 718 and 720 and SBPX 730, 732, 734, 736, 738, 740.

Figure 3:
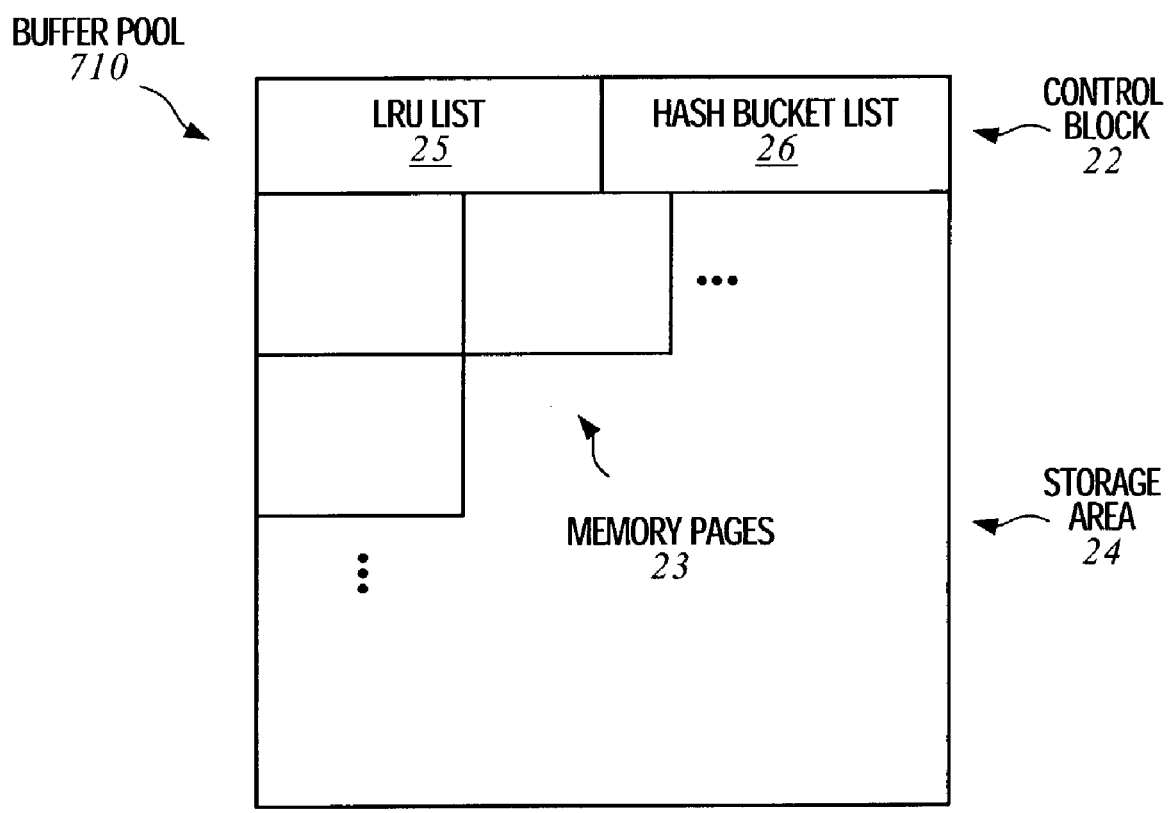
FIG. 3 is a diagram illustrating an exemplary buffer pool of FIG. 2 in greater detail.

An exemplary buffer pool 710 is illustrated in FIG. 3. The other buffer pools 712, 714, 716, 718 and 720 of buffer pools 702 have a similar structure.

Buffer pool 710 includes a storage area 24 and a control block 22. Storage area 24 is an area of volatile memory 17 used to store application data in the form of memory pages 23, described below. As will be appreciated, the number of memory pages 23 in the storage area 24 of the buffer pool 710 may fluctuate during system operation.

The control block 22 contains various data structures that facilitate the management of the memory pages 23 contained in the storage area 24. In the present embodiment, these data structures include a pointer to a Least Recently Used (LRU) linked list that is used to organize the memory pages 23 stored within the storage area 24 in order of most recent use.

This list supports an LRU memory page victimization scheme (referred to herein as the "primary" victimization scheme for reasons that are set forth below) which victimizes the memory pages from the buffer pool 710 that are least recently used and creates representations of those pages in the associated SBPX, as will be described. Also included is a pointer to a hash bucket list 26 data structure which is used to organize memory pages 23 in the buffer pool 710 for subsequent location/retrieval in near constant time, in a manner known to those skilled in the art. Other pointers, data structures or information may be included in control block 22.

Figure 4:
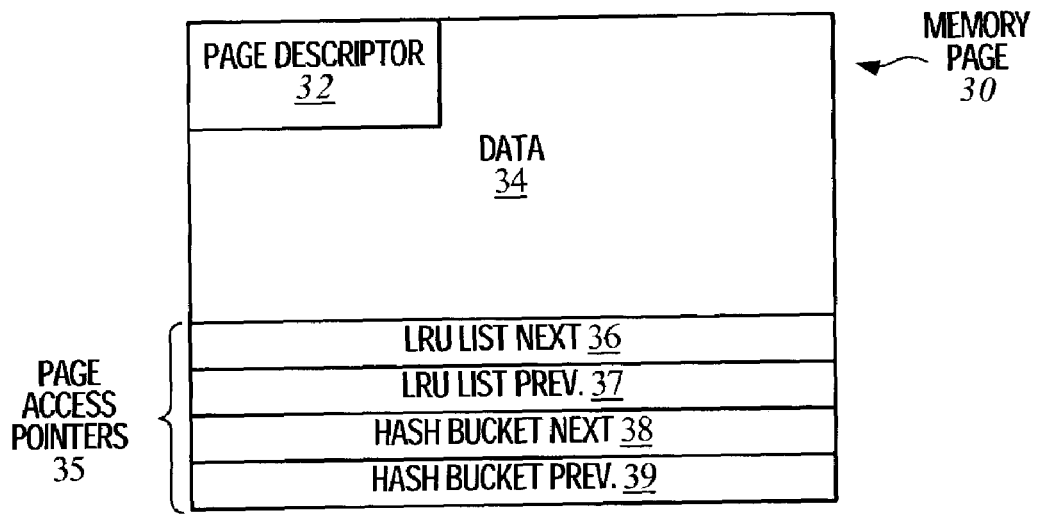
FIG. 4 is a diagram illustrating an exemplary memory page that may be stored in the buffer pool of FIG. 3.

FIG. 4 illustrates a memory page 30 as may be stored in the exemplary buffer pool 710 of FIG. 3. The memory page 30 includes a page descriptor 32 and a data portion 34. The page descriptor 32 uniquely identifies the memory page. The data portion 34 comprises data associated with the memory page, which in the present example may be an airline reservation record comprising a row in a table of relational database 16. It will be appreciated that the size of the page descriptor 32 is substantially smaller (e.g., by at least an order of magnitude) than the size of the data portion 34.

The memory page further has a set of memory page access pointers 35 (possibly comprising part of the page descriptor 32) including LRU list pointers 36 and 37 and hash bucket pointers 38 and 39. LRU list pointers 36 and 37 are used in conjunction with the primary victimization scheme in order to incorporate the memory page into the buffer pool's doubly linked LRU list 25. Hash bucket pointers 38 and 39 are used to incorporate the memory page into an appropriate hash bucket list 26 (which is also doubly linked) for efficient access to stored memory pages. The memory page 30 may further include concurrency control mechanisms (i.e., locks), page status information (e.g., indicators of whether or not the page has been modified since loaded), or other control data (not illustrated).

Figure 5:
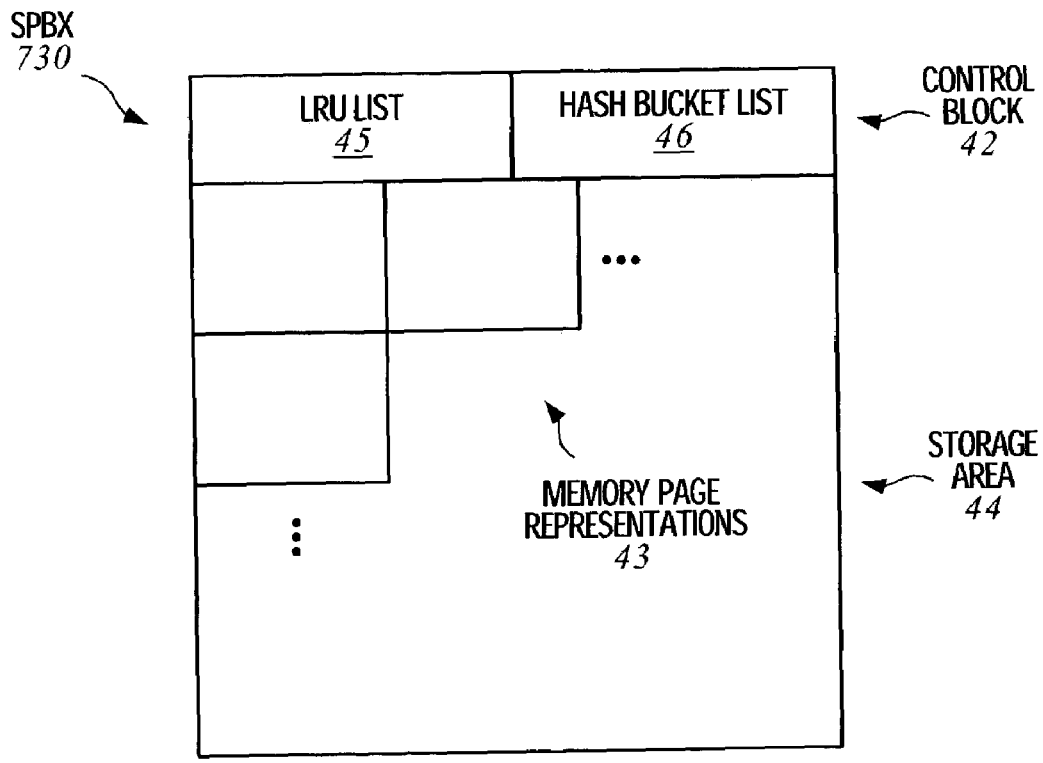
FIG. 5 is a diagram illustrating an exemplary simulated buffer pool extension (SBPX) of FIG. 2 in greater detail.

FIG. 5 illustrates in greater detail a single exemplary SBPX 730 of FIG. 2. The other SBPXs 732, 734, 736, 738 and 740 of SBPXs 704 have a similar structure.

As may be seen in FIG. 5, SBPX 730 has a structure analogous to buffer pool 710. SBPX 730 includes a storage area 44 and a control block 42. Storage area 44 is an area of volatile memory 17 used to store memory page representations (MPRs) 43. The control block 42 contains pointers to data structures for managing the MPRs 43 contained in the storage area 44; these are analogous to the data structures pointed to by control block 22 (FIG. 3) that are used to manage memory pages 23 in each of the buffer pools 702.

These pointers include an LRU list pointer 45 and a hash bucket list pointer 46. The LRU list identified by the LRU list pointer 45 is used in conjunction with a secondary victimization scheme by which MPRs 43 that are least recently used are deleted from the SBPX 730. The hash bucket list data structure identified by the hash bucket list pointer 46 is used to organize MPRs 43 in the SBPX 730 for subsequent location/retrieval in near constant time, in an manner analogous to the storage of memory pages in buffer pool hash tables (described above). Other pointers, data structures or information may be included in control block 42.

Figure 6:
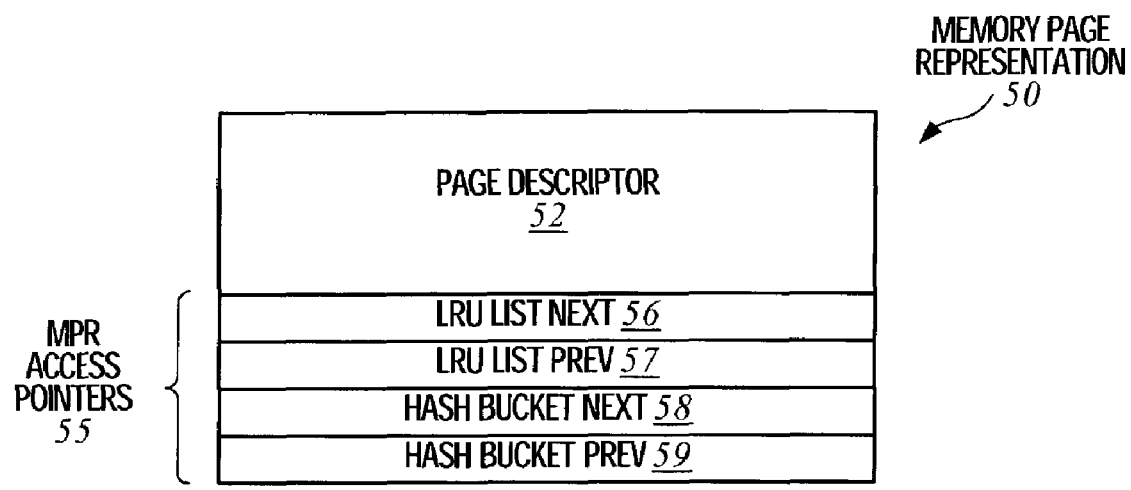
FIG. 6 is a diagram illustrating an exemplary memory page representation (MPR) which may be stored in the SBPX of FIG. 5.

FIG. 6 illustrates an exemplary memory page representation (MPR) 50 that may be stored in the SBPX 730 (or, more precisely, in the storage area 44 of SBPX 730) of FIG. 5. An MPR is a representation of a memory page that was previous stored in a buffer pool but has since been "demoted" to the associated SBPX in accordance with the primary victimization scheme.

Memory page representation 50 includes a page descriptor 52 and MPR access pointers 55. The page descriptor 52 uniquely identifies a memory page (e.g., it may be an address of a memory page in secondary storage 19). In the present embodiment, the page descriptor 52 is the same as the page descriptor 32 (FIG. 4).

When a memory page 30 is victimized in accordance with the primary victimization scheme, the page descriptor 32 is copied to the MPR 50 to create page descriptor 52 during the creation of the MPR 50. MPR access pointers 55 are analogous to the page access pointers 35 of memory page 30 (FIG. 4). It will be appreciated that the MPR 50 is substantially smaller than a corresponding memory page 30 due to the absence of a memory page data portion 34 in the MPR 50.

Figure 7A:
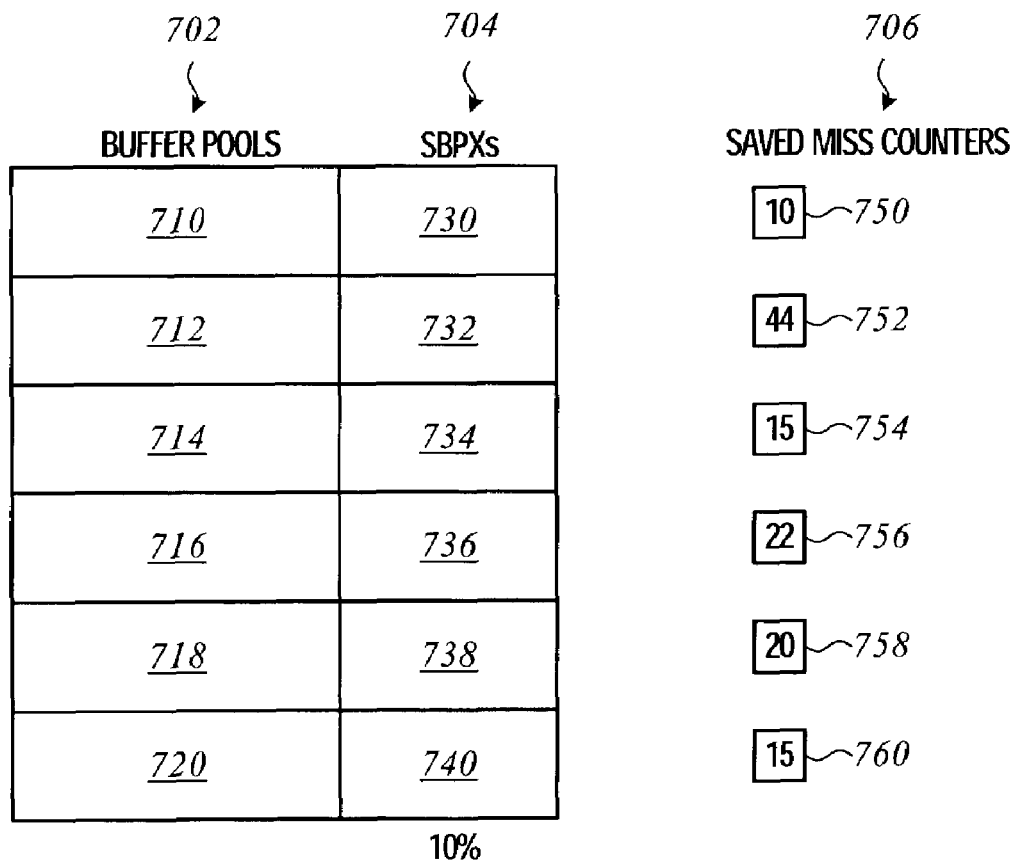
FIG. 7 comprises FIGS. 7A, 7B and 7C, and illustrates exemplary buffer pools and associated data structures of the data processing system of FIG. 1 before, during, and after (respectively) an exemplary memory reallocation.
Figure 7B:
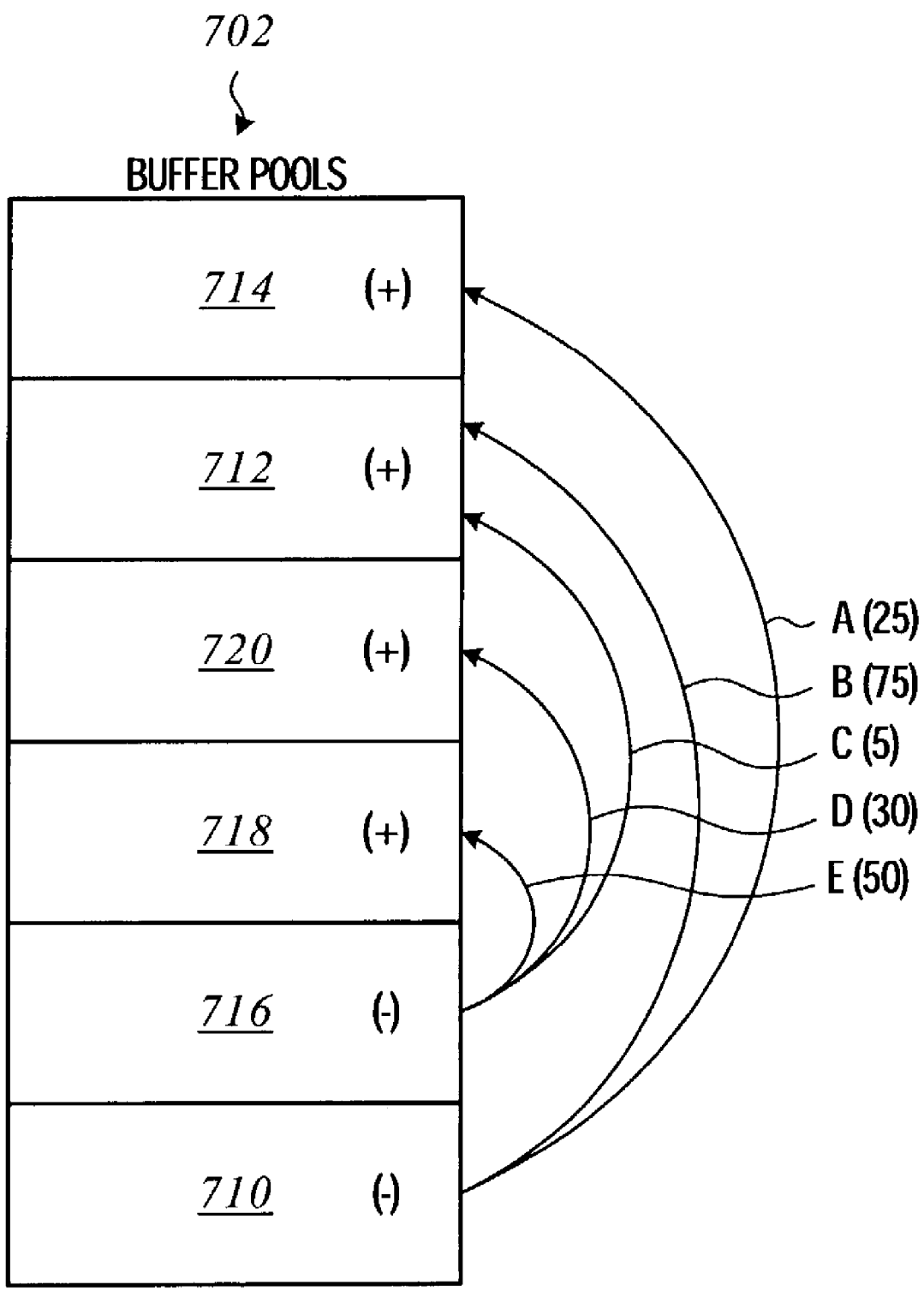
Figure 7C:
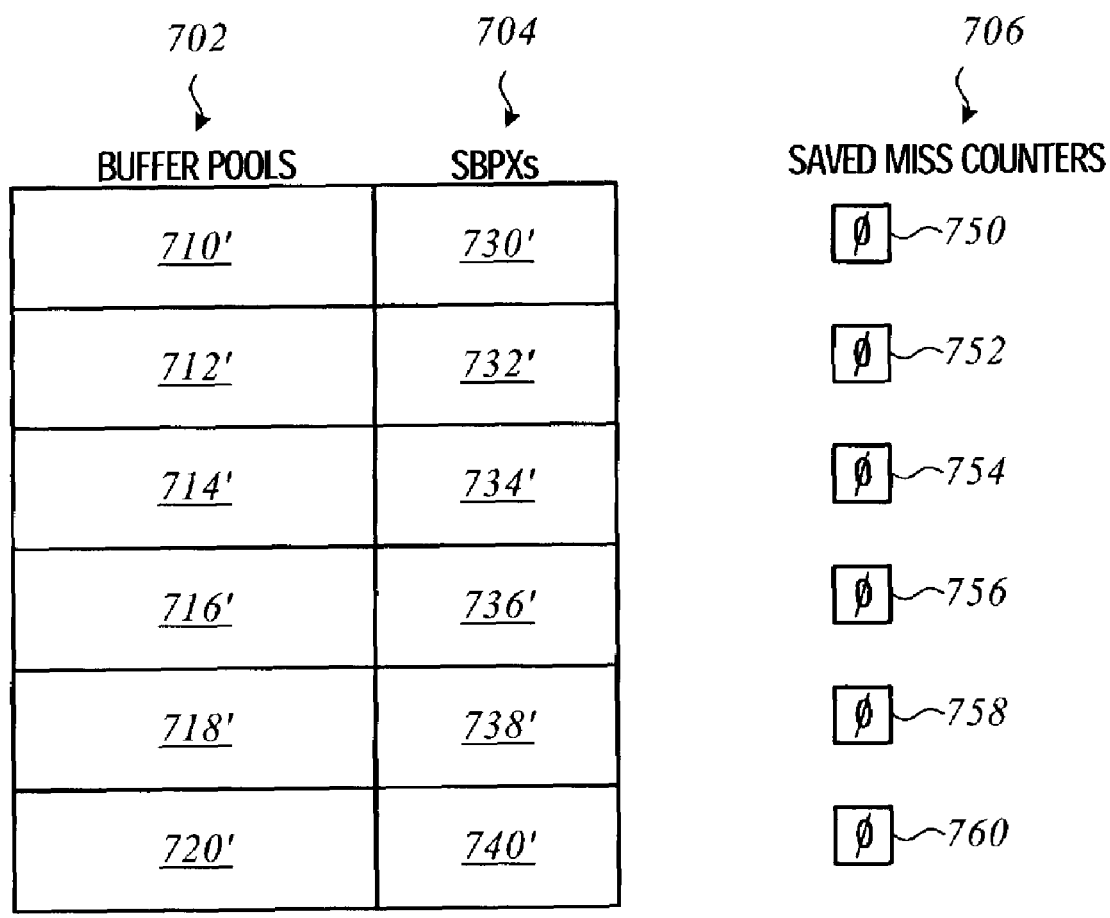

FIG. 7 (FIGS. 7A, 7B, 7C) illustrate the buffer pools 702, SBPXs 704 and "saved miss" counters 706 of FIG. 2 before, during, and after (respectively) the occurrence of an exemplary memory reallocation. SBPXs 704 and "saved miss" counters 706 are omitted from FIG. 7B for clarity. FIG. 7 (FIGS. 7A, 7B, 7C) can be viewed in conjunction with FIG. 8 (FIGS. 8A, 8B, 8C), which illustrate in table form various data maintained and computed by the system 10 for the purposes of dynamic memory reallocation.

FIG. 8A comprises data that reflects the state of system 10 before an exemplary memory reallocation has occurred. FIG. 8B comprises data that reflects the state of system 10 upon the completion of the exemplary memory reallocation. FIG. 8C comprises data that reflects the state of system 10 after the exemplary memory reallocation has been completed and shows preparation for a subsequent memory reallocation.

Referring first to FIGS. 7A and 8A, the buffer pools 702, SBPXs 704 and "saved miss" counters 706 are illustrated in FIG. 7A prior to memory reallocation. Each buffer pool 710, 712, 714, 716, 718 and 720 of FIG. 7A has a different memory page storage capacity which is indicated in table 800 of FIG. 8A (rows 801 to 806, columns a and b). These capacities may be the result of a previous memory reallocation or may be an initial allocation.

It will be appreciated that the storage capacity of each buffer pool 710, 712, 714, 716, 718 and 720 is independently adjustable at run time. The cumulative storage capacity of the buffer pools 702 is fixed at 3750 memory pages. Accordingly, when the storage capacity of one buffer pool is adjusted, a corresponding adjustment in the storage capacity of one or more of the other buffer pools will be required to maintain the cumulative buffer pool capacity at a fixed level.

The SBPXs 704 of FIG. 7A also each have a different capacity; these capacities are indicated (in terms of number of storable MPRs) in table 800 at rows 801–806, column d of FIG. 8A (with the associated SBPX ID being indicated in column c). In the present embodiment, the capacity of SBPXs 704 is automatically set by the instant dynamic memory reallocation scheme to 10% of the capacity of the corresponding buffer pool.

In this example, SBPX 730 has a capacity of 100 MPRs, which is 10% of the 1000 memory pages that the associated buffer pool 710 is capable of containing. It will be appreciated that this manner of determining SBPX capacities is a design parameter of the present dynamic memory reallocation scheme and may be determined differently in other embodiments. For example, the size of each SBPX may set to a fixed number of pages.

Alternatively, SBPX size may be adjustable algorithmically at run time depending upon selected system characteristics. For example, if the capacity of a buffer pool is small, the size of its SBPX can be made comparatively large so that the size of the buffer pool may initially grow at a faster rate with each reallocation until a threshold buffer pool size is reached; thereafter, the size of the SBPX relative to the buffer pool may be reduced to avoid the potential for large buffer pool size fluctuations in subsequent reallocations.

It will further be appreciated that the SBPXs 704 do not necessarily have a fixed cumulative capacity, as have buffer pools 702. The figure "10%" of the SBPXs of FIG. 7A reflects the ratio of SBPX capacity to buffer pool capacity in the present embodiment.

As may be seen in FIG. 7A, each of the "saved miss" counters 706 shows a non-zero tally of saved misses. These tallies represent the number of saved misses detected in the corresponding buffer pools 702 and SBPXs 704 since the previous memory reallocation (for example, "saved miss" counter 752 evidences 44 saved misses in buffer pool 712/SBPX 732 since the last memory reallocation). The tallies shown in the "saved miss" counters 706 also appear in table 800 of FIG. 8A (column e).

In FIG. 8A, table 800 includes various additional data not shown in FIG. 7A that are computed by the data processing system 10 to effect the exemplary memory reallocation. These data include an average cost of a memory page miss (column f), an expected efficiency benefit of extending the buffer pool (column g), and a ranking of the expected benefits across all buffer pools (column h).

The average cost of a memory page miss (column f of table 800) is an average time delay (here, in milliseconds) associated with the accessing of a memory page from the database 16 for each buffer pool. In the present embodiment, these values are empirically determined and may differ from pool to pool.

The expected efficiency benefit of extending each buffer pool as simulated (column g of table 800) is a computed expected gain, measured in time per memory unit (here, milliseconds per page), that is likely to flow from fewer memory page misses in the future for the relevant buffer pool. Higher values are associated with a greater time savings and thus greater benefits.

The expected efficiency benefit values of column g are determined by multiplying the number of saved misses (column e) by the empirically determined average cost of a memory page miss per memory unit (column f) and dividing by the SBPX capacity (column d). Division by the SBPX capacity accounts for the number of pages that need to be allocated to achieve the efficiency benefit.

This is done so that substantively lesser time gains may be ranked above substantively greater time gains in the event that the lesser gains are achievable by adding only a small number of pages versus a large number of pages required to achieve the "greater" gains. For example, one SBPX with a capacity of 10 MPRs (SBPX A) has an expected benefit (saved misses count*cost per miss) of 100 msec while another SBPX with a capacity of 1000 MPRs (SBPX B) has a similarly computed expected benefit of 105 msec. In this example, reallocation to the buffer pool associated with SBPX A will be favored despite the substantively lesser time gains (100 msec vs. 105 msec) because only 10 pages need to be reallocated to achieve this gain versus 1000 pages for SBPX B.

The ranking of expected benefits (column h) is an ordinal ranking of the computed expected efficiency benefits (column g) across all buffer pools. Lower ranking numbers reflect a greater benefit (the highest rank being "1").

FIGS. 7B and 8B illustrate an exemplary memory reallocation. In FIG. 7B, the buffer pools 702 are arranged in decreasing order of expected efficiency benefit. This arrangement facilitates a description of the "greedy" memory reallocation algorithm used in the present embodiment. Rows 811 to 816 of table 810 (FIG. 8B) are similarly arranged in decreasing order of expected efficiency benefit. It will be appreciated that no actual re-ordering or rearrangement of buffer pools occurs in volatile memory 17.

Each arrow A to E between buffer pools in FIG. 7B represents a transfer of memory pages from a donor buffer pool to a recipient buffer pool. The number of transferred memory pages is indicated in parentheses proximate to each arrow and is reflected in column d of table 810 of FIG. 8B. The buffer pool situated at the tail of an arrow is understood to be a donor of memory pages and the buffer pool situated at the head of an arrow is understood to be a recipient of memory pages. The parenthesized "+" and "−" symbols in each of the buffer pools 702 of FIG. 7B indicates whether the buffer pool has gained memory or surrendered memory (respectively) during the exemplary memory reallocation, when the cumulative effect of all of the transfers into or out of the buffer pool is considered.

In corresponding FIG. 8B, column c of table 810 shows the number of reallocatable pages for buffer pools 702; i.e., the maximum number of memory pages that a buffer pool can either surrender or receive during the instant memory reallocation. In the present embodiment, the number of reallocatable pages is set to 10% of the buffer pool's maximum capacity. For example, buffer pool 710, which has a capacity of 1000 memory pages, will have 100 reallocatable pages.

The number of reallocatable pages for each buffer pool matches the SBPX capacity for the buffer pool; this allows the expected efficiency benefit to be realized for at least some of the buffer pools (i.e., the ones that will likely benefit the most from additional memory pages) by way of reallocation of the simulated number of additional memory pages. It will be appreciated, however, that the method of determining a number of reallocatable memory pages for each buffer pool may be different in alternative embodiments; e.g., may be a different percentage or a fixed amount and may vary algorithmically at run time. The number of reallocatable pages of a buffer pool is recomputed prior to each memory allocation in the instant embodiment, thus the number of reallocatable memory pages may change over time as the capacity of the buffer pool changes.

Table 810 of FIG. 8B further shows the number of remaining unallocated pages for each buffer pool at the conclusion of memory reallocation (column e). This value represents the number of reallocatable memory pages which could potentially have been reallocated but were not reallocated upon the convergence of the "greedy" memory reallocation algorithm due to the lack of a corresponding recipient or donor buffer pool. As will be appreciated, the number of remaining unallocated pages upon convergence will usually be zero for each buffer pool except one, but in some cases will be zero for all buffer pools or a number greater than one.

FIGS. 7C and 8C reflect the state of system 10 after the exemplary memory reallocation of FIGS. 7B and 8B has been completed. FIG. 7C illustrates buffer pools 702, SBPXs 704 and "saved miss" counters 706 following reallocation. The buffer pools 702 of FIG. 7C and the rows of FIG. 8C follow the original ordering of FIG. 7A. It will be appreciated that the capacities of the respective buffer pools 702 in FIG. 7C, which are indicated in column b of table 820 (FIG. 8C), are changed from FIG. 7A due to the just-completed memory reallocation. This is reflected in the new numbering of the buffer pools 710', 712', 714', 716', 718' and 720' respectively in FIG. 7C and in table 820 of FIG. 7C (column a).

The capacities of the SBPXs 704 in FIG. 7C are also changed from FIG. 7A; the capacities have been changed to maintain the 10% ratio of the SBPXs 704 to the newly resized buffer pools 702. This is reflected in new numbering 730', 732', 734', 736', 738' and 740' of the SBPXs 704, which are shown after they have been resized. The new SBPX numbering and sizes are also indicated in table 820 (columns c and d).

Figure 9:
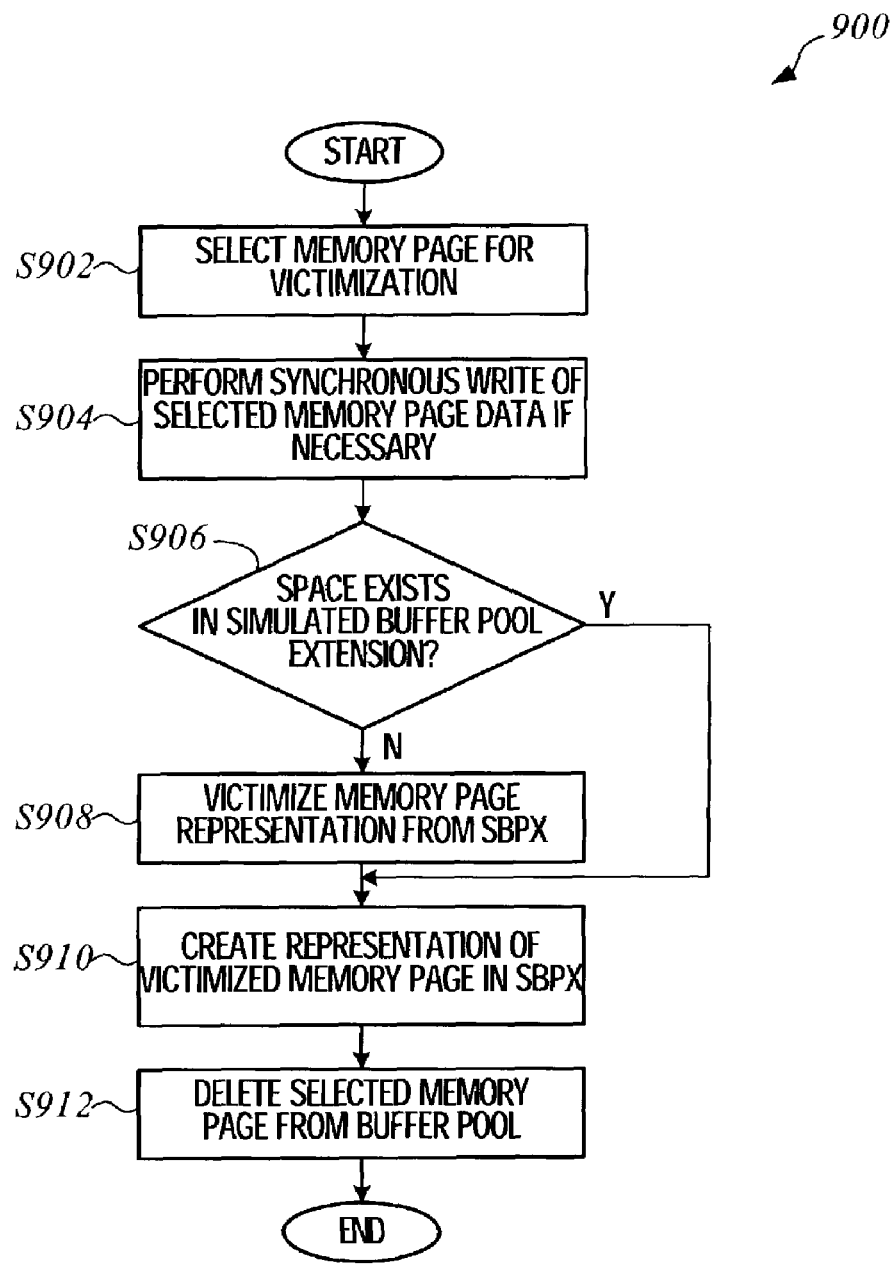
FIG. 9 is a process flow chart illustrating an method of operation for victimizing a memory page from a buffer pool performed by the data processing system of FIG. 1.
Figure 10:
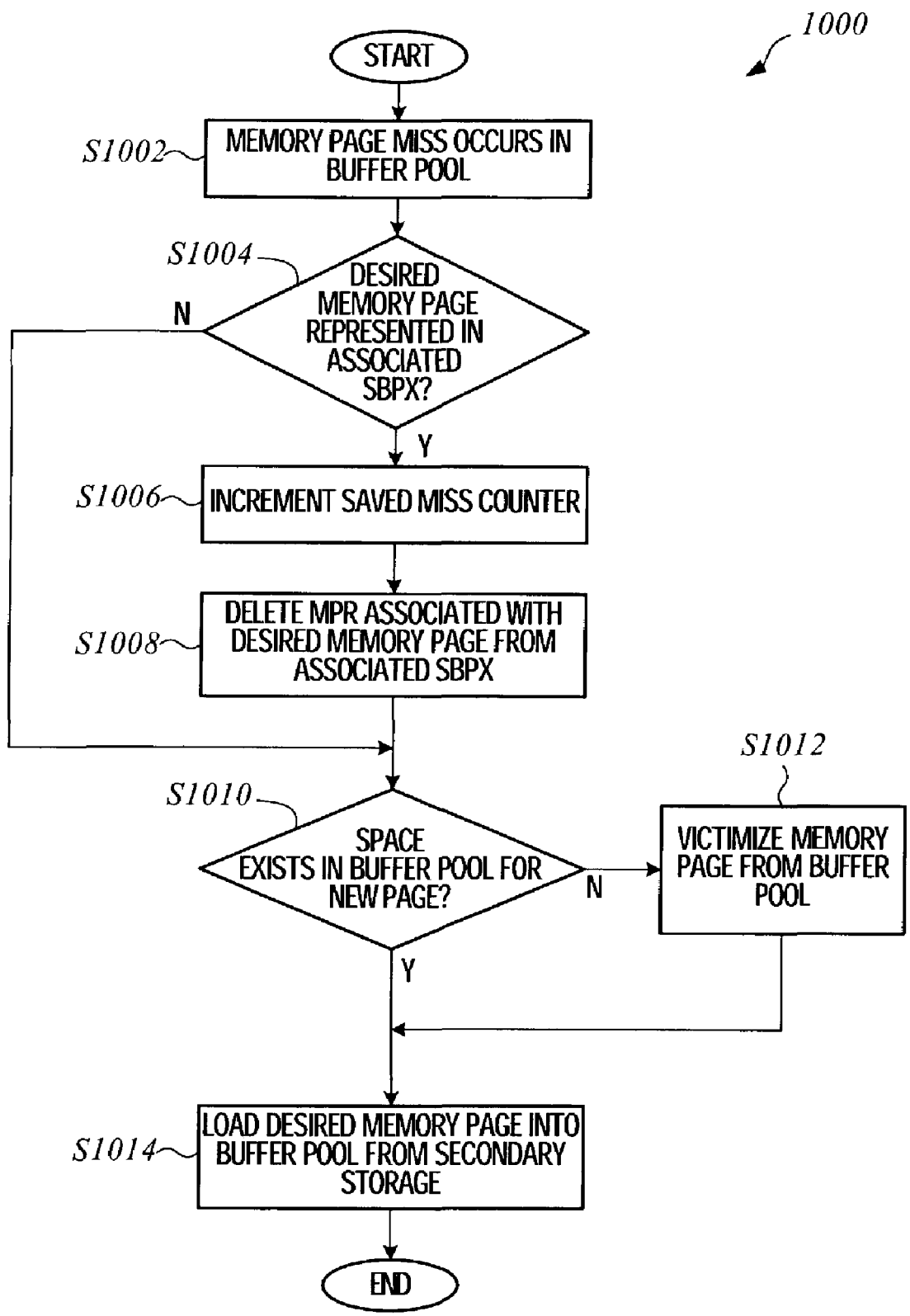
FIG. 10 is a process flow chart illustrating a method of operation for handling a memory page miss in a buffer pool performed by the data processing system of FIG. 1 in accordance with a primary victimization scheme.
Figure 11:
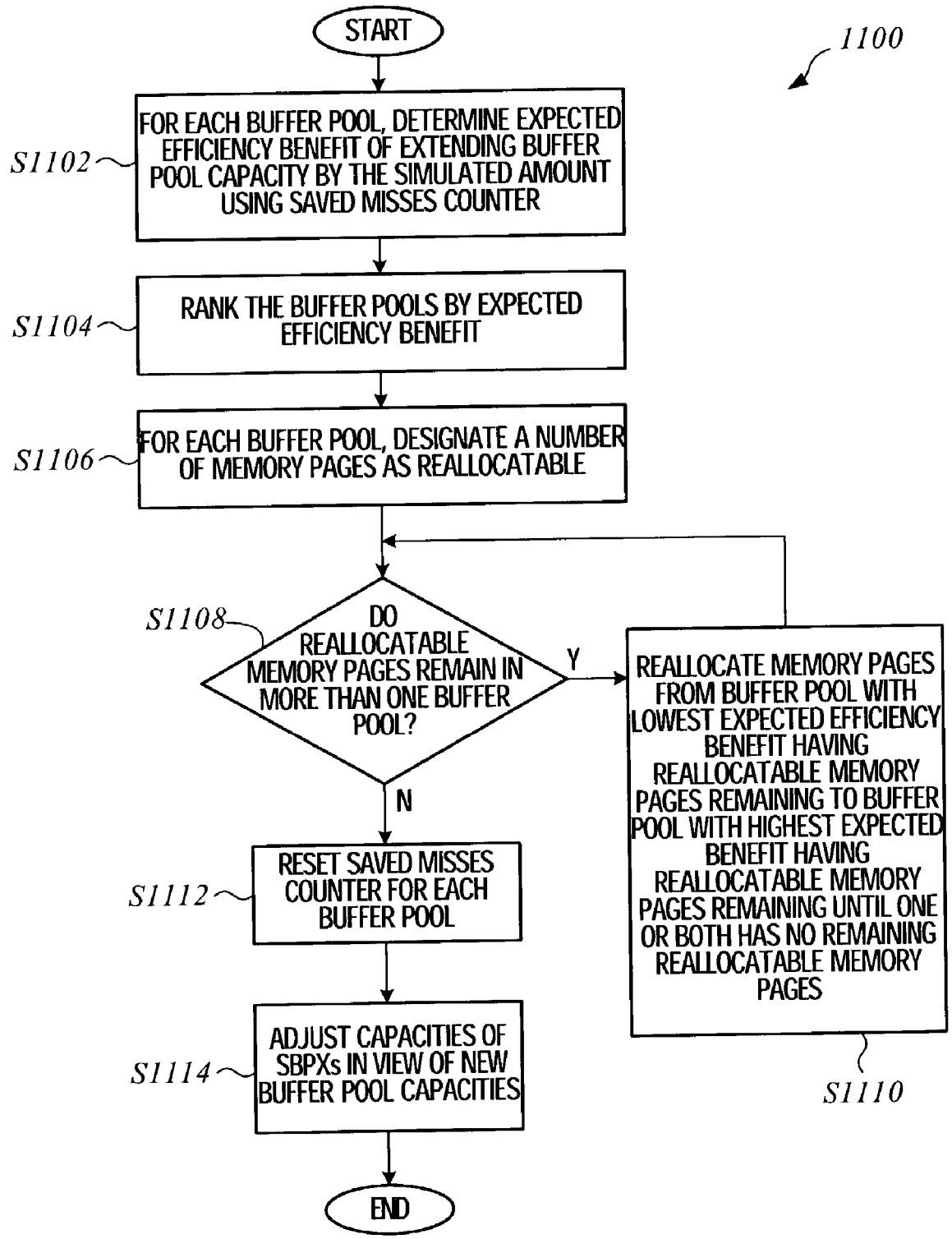
FIG. 11 is a process flow chart illustrating a method of operation for reallocating memory among multiple buffer pools that is periodically performed by the data processing system of FIG. 1.

The operation of the present embodiment is illustrated in FIGS. 9 to 11, with additional reference to FIGS. 1 to 8.

FIG. 9 illustrates operation 900 of the primary victimization scheme used to victimize memory pages from a buffer pool and represent them in an associated SBPX to simulate the effect that the buffer pool extension would have if implemented (i.e., that a memory page which would otherwise be victimized may continue to reside in the buffer pool). Operation 900 occurs as necessary during system operation.

With respect to operation 900, it is initially assumed that an exemplary buffer pool 710 and its associated SBPX 730 (FIG. 7A) are filled to capacity with memory pages and MPRs respectively. It is further assumed that an event has occurred (e.g., a memory page miss) requiring a memory page to be victimized from the buffer pool 710.

Initially, a memory page within the exemplary buffer pool 710 is selected for victimization (S902). In the present embodiment, an LRU primary victimization scheme is employed, thus the selection of S902 simply comprises identifying the least recently used page of the buffer pool 710. This selection is achieved by accessing the last entry in the LRU list 25 of buffer pool 710.

Next, a synchronous write to the database 16 (FIG. 1) is performed (if necessary) to ensure that any updates to memory page data that have been made while the selected page was resident in the buffer pool 710 are not lost (S904). Thereafter, the SBPX 730 associated with the buffer pool 710 is checked to ascertain whether sufficient space exists to store a representation of the memory page selected for victimization from the buffer pool 710 (S906).

In the present example, the SBPX is filled to capacity (the typical case), thus a memory page representation is victimized (removed) from the SBPX 730 (S908) according to the SBPX's secondary victimization scheme. The operative secondary victimization scheme also being an LRU scheme, victimization comprises identifying the least recently used MPR 50 of the SBPX 730 and removing it therefrom.

Thereafter (or if victimization from the SBPX 730 was determined to be unnecessary in S906), a representation of the memory page selected by the primary victimization scheme is created in the SBPX 730 (S910). In the present embodiment, this selection entails copying the page descriptor 32 (FIG. 4) of the victimized memory page representation to the page descriptor 52 of a newly created memory page representation 50 (FIG. 6) of the victimized page.

A hashing algorithm is executed on the page descriptor 32 of the victimized memory page representation and the new MPR 50 is stored in the identified hash bucket through appropriate updating of the MPR's hash bucket list pointers 58, 59 (FIG. 6). Further, the new MPR 50 is added to the beginning of the LRU list 45 of SBPX 730 (FIG. 6) to reflect the status of the MRP 50 as the "most recently used" MPR 50 by way of appropriate updates to the LRU list pointers 56 and 57.

In addition, the selected memory page is deleted from the buffer pool 710 (S912). Operation 900 is now complete and sufficient space for a new memory page has been vacated in buffer pool 710.

It will be appreciated that, in accordance with the operation 900 and the LRU primary victimization scheme, the memory pages represented in the SBPX 730 will all be less recently used than any of the memory pages in the associated buffer pool 710.

FIG. 10 illustrates operation 1000 for processing a memory page miss performed by the data processing system 10 (FIG. 1). Operation 1000 occurs as necessary during system operation.

A memory page miss is initially assumed to occur (S1002) in the exemplary buffer pool 710 (FIG. 7A). Subsequently, the associated SBPX 730 is examined to determine whether a representation of the desired page exists therein (S1004). In the event that the representation of the desired memory page is not found in the SBPX 730, operation continues at S1010, described below.

If, however, a representation of the desired memory page is found in the SBPX 730, the saved miss counter 650 (FIG. 7A) associated with the exemplary buffer pool 710 and SBPX 730 is incremented to reflect the fact that a memory page miss would have been averted if the simulated buffer pool extension were realized (S1006). Thereafter, the located MPR 50 is deleted from the SBPX 730 in anticipation of its promotion to the buffer pool 710 (S1008). This action guards against the introduction of multiple representations of the same memory page in the SBPX 730.

In subsequent operation (S1010 to S1014), the desired memory page is loaded into the buffer pool 710. The buffer pool 710 is checked to ascertain whether or not sufficient space exists in the buffer pool 710 to store the desired memory page (S1010). If the buffer pool 710 is filled to capacity with memory pages, an existing memory page is victimized (S1012) in accordance with the primary victimization scheme illustrated in operation 900 (FIG. 9).

Thereafter, the desired memory page is loaded from the database 16 (FIG. 1) into the buffer pool 710 (S1014). It will be appreciated that if the MPR 50 associated with the desired memory page was deleted from the SBPX 730 in S1008, the memory page victimized in S1012 may be stored in the space that was vacated by the deletion. The loading of S1014 entails storage of the new memory page into the proper hash bucket and identification of the new memory page as the most recently used page, along with the associated modifications to the page access pointers 35, in an analogous manner to the creation of a new MPR 50 in S910 (FIG. 9). The operation 1000 of FIG. 10 is thus concluded.

FIG. 11 illustrates operation 1100 for reallocating memory among buffer pools using the "greedy" memory reallocation algorithm. Operation 1100 is performed periodically (e.g., at fixed time intervals) by the data processing system of FIG. 1 during system operation or execution. It is assumed that the operation 1100 is being performed with respect to the embodiment illustrated in FIGS. 7A to 7C; the data shown in FIGS. 8A to 8C is therefore relevant to the present description.

Initially, the expected efficiency benefit of extending the buffer pool size by the simulated amount of memory pages is determined for each buffer pool (S1102). This value is computed as follows: for each buffer pool, the number of saved misses (column e of table 800 in FIG. 8A) is scaled by an empirically determined average cost of a memory page miss (i.e., access time of secondary storage 19 for the buffer pool in question of column f) and divided by the associated SBPX capacity (column d) to arrive at an expected gain, measured in units of time per memory page, that will likely flow from the extension (column g).

The buffer pools 702 of FIG. 7A are next ranked (S1104) by the expected efficiency benefits computed in S1102. The resultant ranking is shown in column h of table 800 (FIG. 8A) and column a of table 810 (FIG. 8B) and is reflected in the ordering of the buffer pools 702 in FIG. 7B.

Next, a number of memory pages are designated to be reallocatable for each buffer pool (S1106), as described above. The number of reallocatable pages for each of the buffer pools 702 of the present embodiment is set forth in column c of table 810 (FIG. 8B).

In subsequent operation (S1108 and S1110), processing enters a loop whereby memory pages are reallocated in accordance with the "greedy" memory reallocation algorithm, as follows: the buffer pool with the lowest expected efficiency having remaining reallocatable memory pages benefit reallocates memory pages to the buffer pool with the greatest expected efficiency benefit having remaining reallocatable memory pages until one or the other (or both) reallocates all of its reallocatable memory pages. This is repeated until the algorithm converges, e.g., either until all reallocatable memory has been reallocated or until only one buffer pool with reallocatable memory remains.

The effect of executing the above described loop for the buffer pools 702 of FIG. 7A is illustrated in FIG. 7B. Initially, buffer pools 714 and 710 are identified as the buffer pools with the greatest and lowest expected efficiency benefits respectively with reallocatable memory pages remaining (as reflected by the ranking of rows 811 and 816 in table 810 of FIG. 8B).

Accordingly, buffer pool 710 transfers memory pages to buffer pool 714 until one buffer pool or the other (or both) reaches its maximum number of reallocatable memory pages. In this case, the number of reallocatable pages of buffer pool 714, i.e., 25 (see table 810 entry 811c in FIG. 8B), is reached before the number of reallocatable pages of buffer pool 710, i.e., 100 (see table entry 816c) is reached, thus only 25 pages are transferred. This reallocation of 25 memory pages is indicated at arrow A of FIG. 7B.

At this stage, buffer pool 714 has no remaining reallocatable memory pages, thus the buffer pools with the greatest and lowest expected efficiency benefits having remaining reallocatable pages are now buffer pool 712 and 710 respectively (see rows 812 and 816 in table 810, FIG. 8B). Accordingly, buffer pool 710 surrenders it's remaining 75 reallocatable pages to buffer pool 712 as shown by arrow B of FIG. 7B, leaving buffer pool 712 with five remaining reallocatable pages.

The loop repeats in this manner to yield three further reallocations indicated by arrows C, D, and E of FIG. 7B. When these three reallocations are completed, only buffer pool 716 is left with reallocatable memory pages (five in number). These reallocatable memory pages remain because no other buffer pools are left with reallocatable pages, thus no other buffer pools are capable of donating/receiving pages to/from buffer pool 716.

The "greedy" memory reallocation algorithm (S1108 and S100) thus converges with each of the buffer pools except buffer pool 716 having grown or shrunk by 10%. The number of transferred pages and the number of remaining unallocated reallocatable pages for each buffer pool at the conclusion of the instant memory reallocation are indicated in columns d and e respectively of table 810 (FIG. 8B).

The new sizes of each of the buffer pools 702 is shown in table 820 of FIG. 8C (column b). Buffer pools 702 are renumbered 710', 712', 714', 716', 718', and 720' (in column a) of table 820 and in FIG. 7C to reflect their new capacities.

In the event that multiple buffer pools were left with reallocatable memory pages and each buffer pool had the same expected efficiency benefit (or substantially the same expected benefit), the memory reallocation will also converge (although not expressly indicated in FIG. 11) despite the fact that more than one buffer pool is left with remaining reallocatable memory. In this case, convergence is motivated by fact that additional memory page reallocation will not likely provide any benefit.

The "saved miss" counters 706 are reset in preparation for the next memory reallocation (S1112-FIG. 11), as shown in FIG. 7C.

In addition, the capacity of the SBPXs 704 is adjusted to maintain the 10% ratio of SBPX capacity to the (new) capacities of the buffer pools 702 (S1114). The newly sized SBPXs 704 are renumbered 730', 732', 734', 736', 738' and 740' in FIGS. 7C and 8C (in column c of table 820) to reflect their new capacities (indicated at column d of table 820).

The memory reallocation operation 1100 is thus completed. At this stage, the tallying of saved misses may recommence in the resized buffer pools 702 and SBPXs 704 (FIG. 7C) in preparation for the next memory reallocation.

Advantageously, dynamic memory reallocation according to the method described above adapts the buffer pool sizes to actual memory access patterns (as evidenced by the saved miss tallies) regardless of whether those patterns follow statistically projected distributions. The method is thus capable of adapting the buffer pool memory allocation to unforeseen or unanticipated system events.

If permitted by the underlying DBMS implementation, memory reallocation may be performed automatically at run time without any need for a user to suspend or terminate the associated executing application. In addition, extensions of lesser efficacy may be avoided because the expected benefit of each simulated buffer pool extension may be determined without the need to actually extend the buffer pools.

Figure 12:
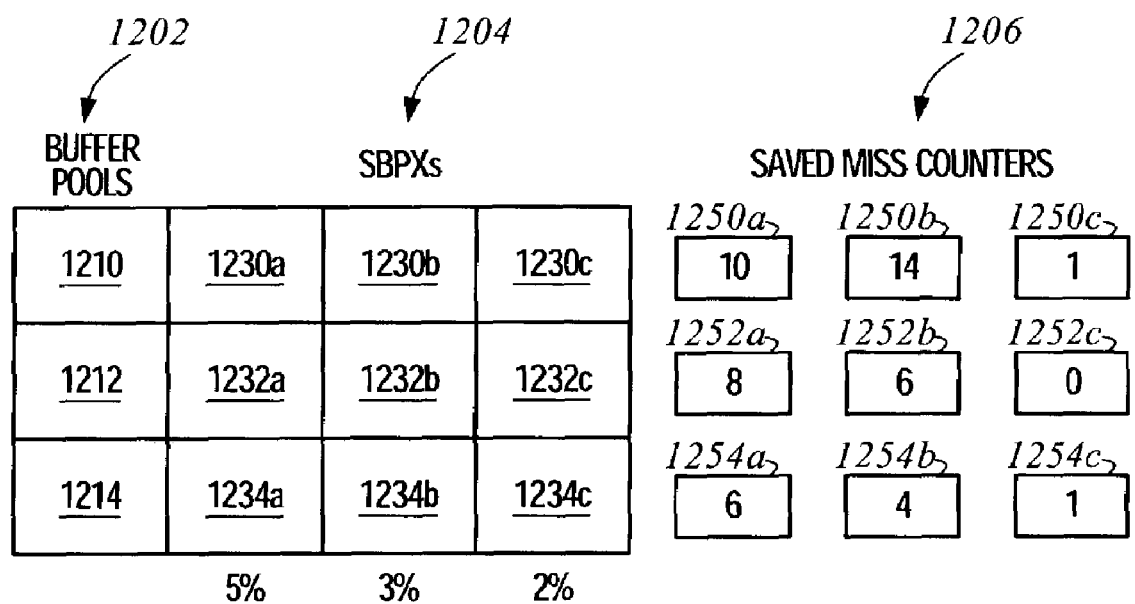
FIG. 12 is a diagram illustrating buffer pools and other data structures of an alternative embodiment of the present invention having multiple SBPXs per buffer pool.

An alternative embodiment of the present invention having multiple SBPXs per buffer pool is illustrated in FIG. 12. The illustrated embodiment allows the effects of extending a buffer pool by three different amounts of memory (here, 5%, 8% and 10% of the capacity of the buffer pool) to be assessed simultaneously.

The illustrated embodiment includes a set of three buffer pools 1202 comprising buffer pools 1210, 1212 and 1214. Each of the buffer pools 1202 has a similar structure to the buffer pool 710 of FIG. 3.

Associated with each buffer pool in the set 1202 are three SBPXs and three saved miss counters (cumulatively comprising nine SBPXs 1204 and nine "saved miss" counters 1206). In particular, buffer pool 1210 has associated with it three SBPXs 1230a, 1230b, 1230c and three "saved miss" counters 1250a, 1250b, 1250c; buffer pool 1212 has associated with it three SBPXs 1232a, 1232b, 1232c and three "saved miss" counters 1252a, 1252b, 1252c; and buffer pool 1214 has associated with it three SBPXs 1234a, 1234b, 1234c and three "saved miss" counters 1254a, 1254b, 1254c. Each of the SBPXs 1204 has a similar structure to the exemplary SBPX 730 of FIG. 5. SBPXs 1230a, 1232a and 1234a are referred to as primary SBPXs; SBPXs 1230b, 1232b and 1234b are referred to as secondary SBPXs; and SBPXs 1230c, 1232c and 1234c are referred to as tertiary SBPXs.

The capacity of each of the SBPXs 1204 is a percentage of the capacity of the corresponding buffer pool; these capacities are indicated below the SBPXs 1204 in FIG. 12. The primary, secondary and tertiary SBPXs are capable of storing 5%, 3% and 2% (respectively) of the number of memory pages that the corresponding buffer pool is capable of containing, with a cumulative storage capacity of 10% of the storage capacity of the corresponding buffer pool. These SBPX capacities are a design parameter of the present embodiment; SBPX capacities in other embodiments may be determined differently (e.g., the capacities may be different percentages or may be set to an absolute or fixed amount of memory for example).

In this example, the comparison between effects of extending a buffer pool by different amounts of memory is achieved by comparing the results of SBPXs 1230a, 1230b, 1230c (5%) with the cumulative results of SBPXs 1230a and 1230b, 1231a and 1231b, 1232a and 1232b (8%) and the cumulative results of all three subcomponents of buffer pools 1210, 1212, 1214 (10%), respectively.

Each of the "saved miss" counters 1206 of FIG. 12 maintains a tally of saved misses occurring in the associated buffer pool and SBPX. For example, saved miss counters 1250a, 1250b, and 1250c are associated with buffer pool 1210 and SBPXs 1230a, 1230b and 1230c respectively; when a memory page miss occurs in buffer pool 1210 and the desired memory page is thereafter found to be represented in the SBPX 1230a, 1230b or 1230c, the saved miss counter 1250a, 1250b, or 1250c (respectively) is incremented. An analogous relationship exists between the other saved miss counters 1252a, 1252b, 1252c and 1254a, 1254b, 1254c and their respective SBPXs 1232a, 1232b, 1232c and 1234a, 1234b, 1234c.

During system operation, when space for new memory pages is needed in a buffer pool 1210, 1212 or 1214, an operative primary victimization scheme victimizes memory pages from the buffer pool and creates representations of the victimized pages in the associated primary SBPX 1230a, 1232a or 1234a respectively.

In the present embodiment, the memory pages that are victimized by the primary victimization scheme are the least recently used memory pages in the buffer pool (i.e., the primary victimization scheme employs an LRU scheme). Consequently, all of the memory pages represented in the primary, secondary and tertiary SBPXs will be less recently accessed than the memory pages represented in the associated buffer pool.

The secondary victimization scheme of the present embodiment is also an LRU scheme, thus the memory pages in the primary, secondary and tertiary SBPXs are ordered by most recent use (i.e., the most recently used memory pages are represented in the primary SBPX while the least recently used memory pages are represented in the tertiary SBPX). When space for a new MPR is needed in an SBPX, a secondary victimization scheme victimizes memory page representations in the following manner pursuant to the operative LRU scheme: MPRs victimized from the primary SBPX are transferred (or "reassigned") to the associated secondary SBPX; MPRs victimized from the secondary SBPX are transferred to the associated tertiary SBPX; and MPRs victimized from the tertiary SBPX are deleted. It is also possible for an MPR to be victimized from within the primary SBPX, secondary SBPX, or tertiary SBPX for promotion to the associated buffer pool, in the event that the relevant memory page is accessed.

Table 1300 of FIG. 13 illustrates various data maintained or computed by the embodiment of FIG. 12 prior to memory reallocation. Rows 1301, 1302 and 1303 of table 1300 contain data that is maintained in conjunction with buffer pools 1210, 1212, and 1214 (respectively). The capacities of buffer pools 1210, 1212 and 1214 are indicated in column b. The remainder of each table row 1301, 1302 and 1303 is broken into three sub-rows (-1, -2 and -3).

The data contained in a sub-row corresponds to a particular SBPX (identified in column c) and a particular "saved miss" counter associated with the relevant buffer pool. For example, the rows 1301-1, 1301-2, 1301-3 pertain to SBPXs 1230a, 1230b, 1230c and "saved miss" counters 1250a, 1250b, 1250c (FIG. 12) respectively. The capacities of each SBPX, which conform to the 5%, 3% and 2% ratios described above, are provided in column d.

The "saved misses" count in column e of table 1300 represents the number of times since the most recent memory reallocation that a memory page which was not found in the corresponding buffer pool was found to be represented in the SBPX associated with the sub-row in which the count is indicated. For example, row 1301 indicates that memory page misses have occurred in buffer pool 1210 on 25 separate occasions since the last memory reallocation, as seen by the sum of the saved misses count in column e for rows 1301-1, 1301-2, and 1301-3. On 10 of those occasions (table entry 1301-1e), the desired page was found to be represented in SBPX 1230a (table entry 1301-1c). On 14 of those occasions (table entry 1301-2e) the desired page was found to be represented in SBPX 1230b (table entry 1301-2c). On one occasion (table entry 1301-3e) the desired page was found to be represented in SBPX 1230c (table entry 1301-3c).

Table 1300 further includes an expected efficiency benefit for each sub-row (column f). The expected efficiency benefit for a particular sub-row represents the expected efficiency benefit for an SBPX having a cumulative capacity which equals the capacity of the SBPX corresponding with that sub-row plus the capacity of all SBPXs associated with the same buffer pool that are referenced in overhead rows.

The expected efficiency benefit is computed by multiplying the average cost of a memory page miss (assumed to be 10 msec for each SBPX) by the cumulative saved misses count (column e) for the current and overhead sub-rows of the relevant row and dividing by the cumulative SBPX capacity (column d) for the current and overhead sub-rows of the relevant row. For example, the expected efficiency benefit in table entry 1301-1f (2.0 milliseconds per page) is computed by multiplying 10 saved misses by 10 msec/miss and dividing by the cumulative SBPX capacity of 50 MPRs (i.e., the capacity of SBPX 1230a) or 5% of the buffer pool capacity.

The expected efficiency benefit in table entry 1301-2f (3.0 milliseconds) is computed by multiplying 24 saved misses by 10 msec/miss and dividing by the cumulative SBPX capacity of 80 MPRs (i.e., the cumulative capacity of SBPXs 1230a and 1230b) or 8% of the buffer pool capacity. The expected efficiency benefit in table entry 1301-3f (2.5 milliseconds) is computed by multiplying 25 saved misses by 10 msec/miss and dividing by the cumulative SBPX capacity of 100 MPRs (i.e., the cumulative capacity of SBPXs 1230a, 1230b and 1230c) or 10% of the buffer pool capacity.

The rationale for computing the expected efficiency benefits in the above described manner is that, in accordance with the operative secondary victimization scheme, a buffer pool's SBPXs are effectively "linked" in sequence in the present embodiment due to the fact that the MPRs are sequentially "demoted" or "reassigned" through the primary, secondary and tertiary SBPXs as they become less recently used. That is, because the existence of an MPR within an SBPX presumes that the MPR has previously been resident in all "preceding" SBPXs, the benefit of extending a buffer pool by the amount of memory represented by a particular SBPX cannot be examined without simultaneously considering the benefit of extending the buffer pool by the amount of memory represented by all such "preceding" SBPXs.

Figure 14:
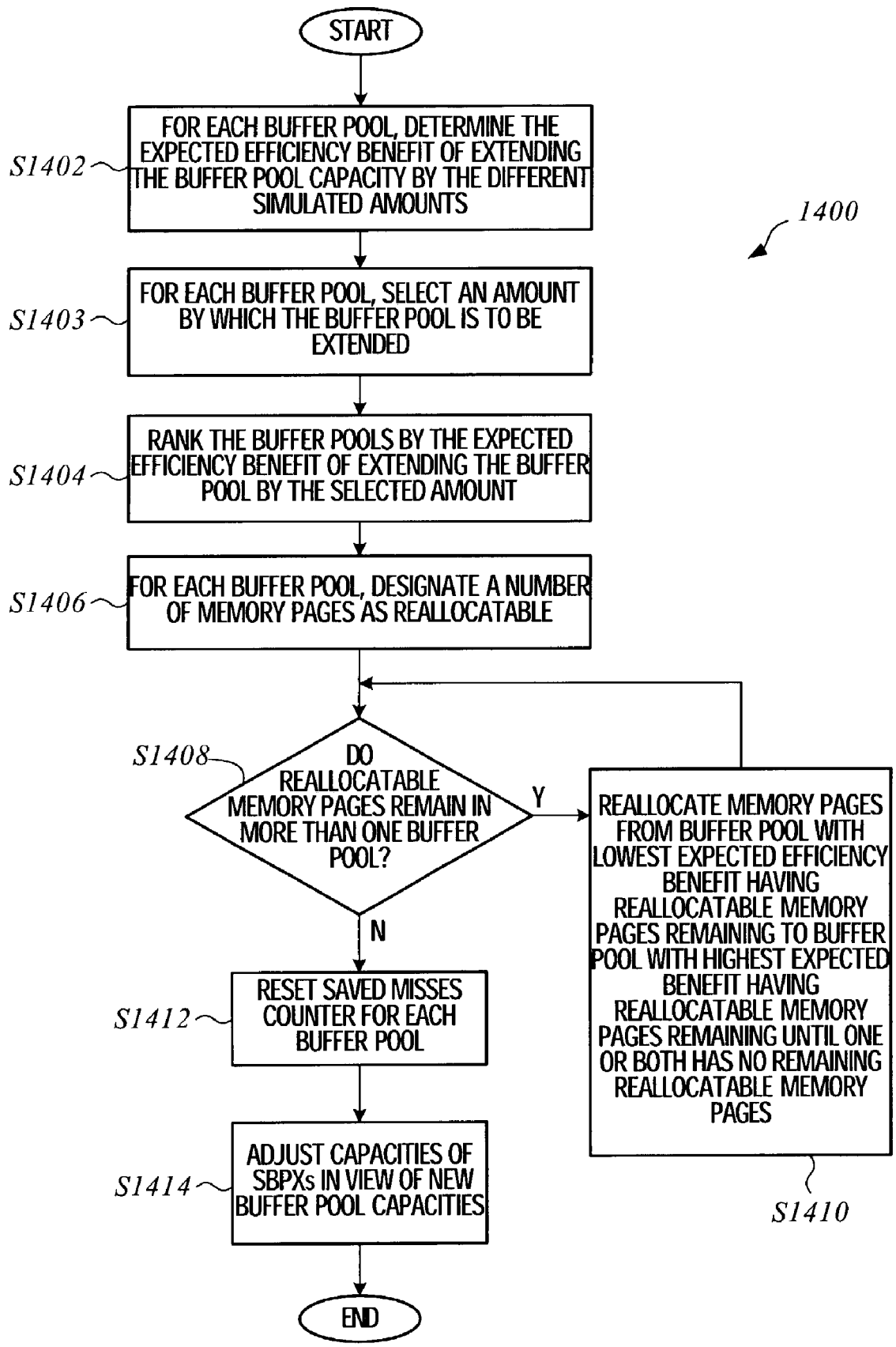
FIG. 14 is a process flow chart illustrating a method of operation for reallocating memory among multiple buffer pools that is periodically performed for the alternative embodiment of FIG. 12.

FIG. 14 illustrates operation 1400 for reallocating memory among buffer pools in the present embodiment using the "greedy" memory reallocation algorithm described previously. As with the operation 1100 (FIG. 11) of the earlier described embodiment, the operation 1400 is performed periodically (e.g., at regular time intervals).

Initially, the expected efficiency benefit of extending the buffer pool size by various simulated amounts of memory (here, 5%, 8% and 10% of the buffer pool capacity) is determined for each buffer pool (S1402). Here, the expected efficiency benefits shown in table 1300 (column f) are computed as described above.

Subsequently, a buffer pool extension capacity is selected for each buffer pool (S1403). This involves an examination of the computed expected benefits (column f) to ascertain which of the simulated buffer pool capacities (5%, 8% or 10%) should be chosen as the amount by which the buffer pools should be extended. In the present embodiment, the buffer pool extension size providing the largest expected efficiency benefit is selected.

For example, it may be observed in table 1300 of FIG. 13 that, for each of the buffer pools 1210, 1212 and 1214, the expected benefit associated with an SBPX having an 8% capacity (see table entries 1301-2f, 1302-2f and 1303-2f) is higher than the expected efficiency benefit associated with an SBPX with a 5% capacity (table entries 1301-1f, 1302-1f and 1303-1f) or 10% capacity (table entries 1301-3f, 1302-3f and 1303-3f). Accordingly, it is concluded that SBPX capacities of 8% of buffer pool capacity will provide the greatest expected benefit in the instant example.

It is of course possible that the SBPX size (i.e., percentage) which provides the greatest expected efficiency benefit for a buffer pool may differ from pool to pool. In this case, different buffer pool extension percentages may be chosen for different buffer pools, to maximize expected efficiency gains.

The buffer pools are next ranked (in S1404) by the expected efficiency benefit associated with the SBPX capacities chosen in S1403. In this case, SBPX capacities of 8% are chosen, thus the expected efficiency benefits that are ranked are those set forth in table 1300 entries 1301-2f, 1302-2f, and 1303-2f (FIG. 13). The ranking which occurs in S1404 is performed in the same manner as described previously in conjunction with S1104 of FIG. 11.

The remaining operation S1406 to S1414 of FIG. 14 is the same as the operation S1106 to S1114 of FIG. 11.

It will be appreciated that the effect of simultaneously extending buffer pools by more than one amount of memory may alternatively be achieved using only a single SBPX per buffer pool. A set of pointers at predetermined spacings within the SBPX (e.g., at 25%, 50% and 75% of the SBPX's size) that are advanced or adjusted as MPRs are victimized may serve as boundary indicators within the SBPX which effectively demarcate smaller SBPXs of chosen sizes.

A saved miss counter may be maintained for each of the demarcated SBPX portions in an manner analogous to the multiple saved miss counters maintained for each buffer pool described above; the tallies in these counters may be used to compute expected efficiency benefits for the different SBPX portions, which may in turn be used to select an optimal SBPX size. Such an approach may provide an performance enhancement over the multi-SBPX approach in that the possible need to physically move victimized MPRs between primary, secondary, tertiary, or further SBPXs may be avoided, with such "reassignment" being achieved through boundary pointer adjustments.

It is to be understood that the specific embodiments of the invention that have been described are merely illustrative of certain application of the principle of the present invention. As will be appreciated by those skilled in the art, numerous modifications to the method for autonomically optimizing memory distribution among buffer pools in a data processing system can be made without departing from the essence of the invention.

For example, system 10 may comprise multiple computing devices and not just a single computing device 12 in an alternative embodiment. The RDBMS 14 and database 16 may each be hosted on a separate device for example. In this case, the system 10 may include a network that facilitates intercommunication between the devices.

As well, it is not necessary for expected efficiency benefits to be expressed in terms of an anticipated reduction in secondary storage 19 access time. Rather, expected efficiency benefits may be expressed in terms of saved misses per memory unit, for example, in the event that the time required to access secondary storage 19 is sufficiently consistent over time for all buffer pools.

Also, for the purposes of calculating the expected efficiency benefit of a particular SBPX, the cost for a miss in the associated buffer pool need not be measured in terms of a time delay or other penalty associated with reading data from secondary storage 19. Rather, other cost parameters may be employed. For example, in the event that calculated data is being cached, the cost of a miss may represent a data recalculation cost.

It should also be appreciated that units of data other than fixed-size memory pages may be employed in alternative embodiments. For example, variable size pages could be used. In this case, the expected efficiency benefit could be computed on a per-byte basis.

More fundamentally, the described approach could be applied to caches that are not associated with a database system which store items other than memory pages (e.g., cache lines).

Additionally, it is not necessary for the primary victimization scheme and secondary victimization scheme to employ a LRU approach to target memory pages and MPRs (respectively) for victimization. Other approaches, such as the CLOCK and GCLOCK variations, or others, may be employed.

In addition, the time period between memory reallocations may be adjusted to accommodate differing workload characteristics.

It will be appreciated that computer readable code may be uploaded (by a vendor) and downloaded (by an end user) via a network adapted for transporting or carrying a computer readable modulated carrier signal. The signal may embed computer readable code that may be used for establishing the embodiments of the present invention. As an example, the present system is capable of establishing a method for autonomically optimizing memory distribution among buffer pools in a data processing system, or establishing a data product including a data processing system readable medium having system programmed instructions embodied therein for directing a data processing system to implement a method for autonomically optimizing memory distribution among buffer pools in a data processing system.

Alternatively, the present system is capable of establishing a data processing system having a processor operationally coupled to memory for storing processor readable and executable instructions for directing the data processing system to undertake a method for autonomically optimizing memory distribution among buffer pools in a data processing system, or for establishing a simulated buffer pool extension data structure comprising at least one representation of data victimized from a buffer pool. The data representation uniquely identifies, and being smaller than, the data. Included in the meaning of the modulated carrier signal is a signal-bearing medium.

It should be clear that the specific embodiments of the present invention that have been described are merely illustrative of certain application of the principle of the present invention. Numerous modifications may be made to the system and method for autonomically reallocating memory among buffer pools without departing from the spirit and scope of the present invention.

What is claimed is:

1. A method for autonomically optimizing memory distribution among a plurality of buffer pools, comprising:

for each buffer pool, storing representations of data that has been victimized in an associated simulated buffer pool extension;

wherein the representations are smaller than the victimized data;

for each buffer pool, tallying requests for data that is not resident in the buffer pool and that is represented in the associated simulated buffer pool extension;

wherein the associated simulated buffer pool extension comprises a primary simulated buffer pool extension; and victimizing at least one data representation from the primary simulated buffer pool extension as the primary simulated buffer pool extension is filled to capacity prior to storing the representations into the primary simulated buffer pool extension.

2. The method of claim 1, further comprising determining, at least in part from the tallying requests, an expected efficiency benefit of increasing a capacity of each buffer pool.

3. The method of claim 2, further comprising determining a size of reallocatable memory.

4. The method of claim 3, further comprising reallocating memory from a first buffer pool with a lowest expected efficiency benefit having remaining reallocatable memory, to a second buffer pool with a highest expected efficiency benefit having remaining reallocatable memory, until any one or more of the first and second buffer pools have no remaining reallocatable memory.

5. The method of claim 4, further comprising repeating the step of reallocating until either one of the following conditions is satisfied: all reallocatable memory has been reallocated, or only one buffer pool with reallocatable memory remains.

6. The method of claim 4, further comprising repeating the step of reallocating until a plurality of buffer pools with reallocatable memory remain and an expected efficiency benefit for each of the plurality of buffer pools is substantially the same.

7. The method of claim 2, wherein the expected efficiency benefit is an anticipated reduction in secondary storage access time.

8. The method of claim 7, wherein the expected efficiency benefit is determined, in part, from an empirically determined secondary storage access time.

9. The method of claim 1, wherein a capacity of each simulated buffer pool extension is determined based on a capacity of the buffer pool with which the simulated buffer pool extension is associated.

10. The method of claim 3, wherein determining an amount of reallocatable memory for each buffer pool is based, at least in part, on a capacity of the buffer pool.

11. The method of claim 2, wherein determining the expected efficiency benefit occurs periodically.

12. The method of claim 1, wherein the data includes memory pages.

13. The method of claim 1, wherein the data includes cache lines.

14. The method of claim 1, wherein the data victimized from each buffer pool includes least recently used data.

15. The method of claim 1, further comprising storing the at least one data representation that has been victimized from the primary simulated buffer pool extension into a secondary simulated buffer pool extension.

16. The method of claim 15, further comprising, for each buffer pool, tallying requests for data that is not resident in the buffer pool, which data is represented in the secondary simulated buffer pool extension.

17. The method of claim 16, further comprising, for each buffer pool, determining a first expected efficiency benefit of increasing the capacity of the each buffer pool by a simulated capacity of the primary simulated buffer pool extension.

18. The method of claim 17, further comprising, for each buffer pool, determining a second expected efficiency benefit of increasing the capacity of each buffer pool by a simulated capacity of the primary simulated buffer pool extension and the secondary simulated buffer pool extension.

19. The method of claim 18, further comprising, for all the buffer pools, selecting one of the first expected efficiency benefit or the second expected efficiency benefit.

20. A computer program product having instruction codes for autonomically optimizing memory distribution among a plurality of buffer pools, comprising:

a first set of instruction codes for storing, for each buffer pool, representations of data that has been victimized in an associated simulated buffer pool extension;

wherein the representations are smaller than the victimized data; and a second set of instruction codes for tallying requests, for each buffer pool, for data that is not resident in the buffer pool and that is represented in the associated simulated buffer pool extension;

wherein the associated simulated buffer pool extension comprises a primary simulated buffer pool extension; and a third set of instruction codes for victimizing at least one data representation from the primary simulated buffer pool extension as the primary simulated buffer pool extension is filled to capacity prior to storing the representations into the primary simulated buffer pool extension.

21. The computer program product of claim 20, further comprising a fourth set of instruction codes for determining, at least in part from the tallying requests, an expected efficiency benefit of increasing a capacity of each buffer pool.

22. The computer program product of claim 21, further comprising a fifth set of instruction codes for determining a size of reallocatable memory.

23. The computer program product of claim 22, further comprising a sixth set of instruction codes for reallocating memory from a first buffer pool with a lowest expected efficiency benefit having remaining reallocatable memory, to a second buffer pool with a highest expected efficiency benefit having remaining reallocatable memory, until any one or more of the first and second buffer pools have no remaining reallocatable memory.

24. The computer program product of claim 23, wherein the sixth set of instruction codes repeats the step of reallocating until either one of the following conditions is satisfied: all reallocatable memory has been reallocated, or only one buffer pool with reallocatable memory remains.

25. The computer program product of claim 23, wherein the sixth set of instruction codes further repeats the step of reallocating until a plurality of buffer pools with reallocatable memory remain and an expected efficiency benefit for each of the plurality of buffer pools is substantially the same.

26. The computer program product of claim 21, wherein the expected efficiency benefit is an anticipated reduction in secondary storage access time.

27. The computer program product of claim 26, wherein the expected efficiency benefit is determined, in part from an empirically determined secondary storage access time.

28. The computer program product of claim 20, wherein a capacity of each simulated buffer pool extension is determined based on a capacity of the buffer pool with which the simulated buffer pool extension is associated.

29. The computer program product of claim 22, wherein the fifth set of instruction codes determines an amount of reallocatable memory for each buffer pool is based, at least in part, on a capacity of the buffer pool.

30. A system having instruction codes for autonomically optimizing memory distribution among a plurality of buffer pools, comprising:

means for storing, for each buffer pool, representations of data that has been victimized in an associated simulated buffer pool extension;

wherein the representations are smaller than the victimized data; and means for tallying requests, for each buffer pool, for data that is not resident in the buffer pool and that is represented in the associated simulated buffer pool extension;

wherein the associated simulated buffer pool extension comprises a primary simulated buffer pool extension; and means for victimizing at least one data representation from the primary simulated buffer pool extension as the primary simulated buffer pool extension is filled to capacity prior to storing the representations into the primary simulated buffer pool extension.

31. The system of claim 30, further comprising means for determining, at least in part from the tallying requests, an expected efficiency benefit of increasing a capacity of each buffer pool.

32. The system of claim 31, further comprising means for determining a size of reallocatable memory.

33. The system of claim 32, further comprising means for reallocating memory from a first buffer pool with a lowest expected efficiency benefit having remaining reallocatable memory, to a second buffer pool with a highest expected efficiency benefit having remaining reallocatable memory, until any one or more of the first and second buffer pools have no remaining reallocatable memory.

34. The system of claim 33, wherein the means for reallocating further repeats the step of reallocating until either one of the following conditions is satisfied: all reallocatable memory has been reallocated, or only one buffer pool with reallocatable memory remains.

35. The system of claim 33, wherein the means for reallocating further repeats the step of reallocating until a plurality of buffer pools with reallocatable memory remain and an expected efficiency benefit for each of the plurality of buffer pools is substantially the same.

36. The system of claim 31, wherein the expected efficiency benefit is an anticipated reduction in secondary storage access time.

37. The system of claim 36, wherein the expected efficiency benefit is determined, in part, from an empirically determined secondary storage access time.

38. The system of claim 30, wherein a capacity of each simulated buffer pool extension is determined based on a capacity of the buffer pool with which the simulated buffer pool extension is associated.

39. The system of claim 32, wherein the means for determining the size of reallocatable memory determines an amount of reallocatable memory for each buffer pool is based, at least in part, on a capacity of the buffer pool.

40. The system of claim 30, further comprising means for storing the at least one data representation that has been victimized from the primary simulated buffer pool extension into a secondary simulated buffer pool extension.

41. The system of claim 40, further comprising, for each buffer pool, means for tallying requests for data that is not resident in the buffer pool, which data is represented in the secondary simulated buffer pool extension.

42. The system of claim 41, further comprising, for each buffer pool, means for determining a first expected efficiency benefit of increasing the capacity of the each buffer pool by a simulated capacity of the primary simulated buffer pool extension.

43. The system of claim 42, further comprising, for each buffer pool, means for determining a second expected efficiency benefit of increasing the capacity of each buffer pool by a simulated capacity of the primary simulated buffer pool extension and the secondary simulated buffer pool extension.

44. The system of claim 43, further comprising, for all the buffer pools, means for selecting one of the first expected efficiency benefit or the second expected efficiency benefit.

* * * * *